United States Patent
Asano et al.

(10) Patent No.: US 6,371,512 B1
(45) Date of Patent: Apr. 16, 2002

(54) AIRBAG APPARATUS FOR HEAD-PROTECTING

(75) Inventors: Toshiyuki Asano, Toyota; Etsuji Saito, Nissin; Minoru Chida, Toyota; Kazuhiro Nagai, Nagoya; Hiroyuki Okamoto, Okazaki, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/362,902

(22) Filed: Jul. 29, 1999

(30) Foreign Application Priority Data

| Aug. 3, 1998 | (JP) | ............ | 10-219231 |
| Oct. 16, 1998 | (JP) | ............ | 10-295838 |
| Dec. 1, 1998 | (JP) | ............ | 10-341445 |

(51) Int. Cl.⁷ .................................. B60R 21/22
(52) U.S. Cl. ................. 280/730.2; 280/728.2; 280/743.1; 280/749
(58) Field of Search .............. 280/730.2, 730.1, 280/728.1, 728.2, 743.1, 749

(56) References Cited

U.S. PATENT DOCUMENTS

| 5,265,903 A | * | 11/1993 | Kuretake et al. | ......... 280/730.2 |
| 5,316,336 A | * | 5/1994 | Taguchi et al. | .......... 280/730.2 |
| 5,322,322 A | * | 6/1994 | Bark et al. | .............. 280/730.2 |
| 5,333,899 A | * | 8/1994 | Witte | ...................... 280/730.2 |
| 5,588,672 A | * | 12/1996 | Karlow et al. | ........... 280/730.2 |
| 5,605,346 A | * | 2/1997 | Cheung et al. | .......... 280/728.2 |
| 5,636,861 A | * | 6/1997 | Orsulak et al. | .......... 280/730.1 |
| 5,730,463 A | * | 3/1998 | Fisher et al. | ............. 280/743.1 |
| 5,755,457 A | * | 5/1998 | Specht | .................... 280/728.2 |
| 5,788,270 A | | 8/1998 | Haland et al. | |
| 5,791,683 A | * | 8/1998 | Shibata et al. | ........... 280/730.2 |
| 5,884,937 A | * | 3/1999 | Yamada | |
| 5,884,939 A | * | 3/1999 | Yamaji et al. | ............ 280/743.1 |
| 5,924,723 A | * | 7/1999 | Brantman et al. | ........ 280/730.2 |
| 5,938,233 A | * | 8/1999 | Specht | .................... 280/730.2 |
| 5,947,487 A | * | 9/1999 | Stutz | ....................... 280/730.2 |
| 6,073,961 A | * | 6/2000 | Bailey et al. | ............. 280/730.2 |
| 6,082,761 A | * | 7/2000 | Kato et al. | ............... 280/730.2 |
| 6,095,551 A | * | 8/2000 | O'Docherty | ............. 280/730.2 |
| 6,102,435 A | * | 8/2000 | Wallner et al. | .......... 280/730.2 |
| 6,129,377 A | * | 10/2000 | Okamura et al. | ........ 280/730.2 |

FOREIGN PATENT DOCUMENTS

| EP | 0 814 001 A1 | 6/1997 |
| EP | 0 855 315 A1 | 1/1998 |
| JP | 08-040165 | 2/1996 |
| JP | 09-142245 | 6/1997 |
| JP | 9-156450 | 6/1997 |
| JP | 09-249089 | 9/1997 |
| JP | 10-138858 | 5/1998 |
| JP | 10-203289 | 8/1998 |
| JP | 301375 | 10/2000 |

* cited by examiner

*Primary Examiner*—Brian L. Johnson
*Assistant Examiner*—Deanna Draper
(74) *Attorney, Agent, or Firm*—Pillsbury Winthrop LLP

(57) ABSTRACT

In a head-protecting airbag apparatus where an airbag body inflated in a curtain configuration is mounted in a folded state along a roof side rail across at least a center pillar, the airbag body includes an upper portion folded in a bellows, and a lower portion subjected to one of turning-back performed toward an occupant compartment inner side and rolling-up performed towards the occupant compartment inner side. Accordingly, even when there is a vehicle occupant compartment inner side protrusion such as a slip joint in a vehicle, the airbag body is inflated and expanded so as to cover the vehicle occupant compartment inner side protrusion from the above or ride on the same. As a result, the lower portion of the airbag body is hard to be caught up by the vehicle occupant compartment inner side protrusion, thereby improving a expanding performance of the airbag body.

14 Claims, 21 Drawing Sheets

AIRBAG APPARATUS FOR HEAD-PROTECTING

BACKGROUND OF THE INVENTION

1. Field of the Invention

The present invention relates to a head-protecting airbag apparatus provided with a head-protecting airbag body which is accommodated from a pillar portion along a roof side rail portion and is inflated in a curtain shape by gas injected from an inflator when at least predetermined high load acts on a vehicle side body.

2. Description of the Related Art

For the purpose of improvement in performance for protecting the head of a vehicle occupant sitting on a front seat when at least predetermined load acts on a vehicle side body, there has been proposed a head-protecting airbag apparatus where an airbag body accommodated in a folded state from a front pillar portion along a roof side rail portion is inflated in a curtain shape along a side window glass. A configuration of a head-protecting airbag apparatus disclosed in WO 96/26087 will be explained below.

As shown in FIG. 21, a head-protecting airbag apparatus 400 is configured as main elements with an elongated duct 406 disposed from a front pillar portion 402 along a roof side rail portion 404, an airbag body 412 accommodated in its folded state within the duct 406 and fixed at a front end fixing point and a rear end fixing point on a vehicle body side, an inflator connected to a rear end of the duct 406 through a hose 414, for injecting gas when a predetermined or higher high load acts on a vehicle side portion, and a strip-like strap whose one end portion is fixed at a vehicle body side and the other end thereof is fixed to a rear end portion of the airbag body 412. Further, the airbag body 412 is configured by connecting a plurality of cells 420 in parallel, each cell being formed in an almost cylindrical shape and disposed such that its longitudinal direction is directed to an almost vertical direction.

According to the above configuration, when a predetermined or higher load acts on the vehicle body side portion, gas is injected from the inflator 416. For this reason, the gas injected flows into the respective cells 420 of the folded airbag body 412 through the hose 414 and the duct 406. As a result, the respective cells 420 are inflated in an almost cylindrical shape whose longitudinal direction corresponds to an almost vertical direction of a vehicle, so that the airbag body 412 is inflated in a curtain configuration. Furthermore, since the rear end portion of the airbag body 412 is connected to the vehicle body side through the strap 418, the rear side of the airbag body 412 is securely positioned inside an upper portion of a center pillar portion 424 of the vehicle.

However, in such a head-protecting airbag apparatus, when a folded airbag body is inflated, a lower portion of the airbag body is moved downwardly along a pillar garnish disposed at an inside portion of a center pillar portion in an occupant compartment. At this time, in a vehicle where an occupant compartment projection such as a slip joint is disposed, it is considered that a lower portion of the airbag body during its expansion may be caught up by the vehicle occupant compartment projection so that an appropriate expansion of the airbag body may be prevented.

SUMMARY OF THE INVENTION

In view of the above fact, an object of the present invention is to provide a head-protecting airbag apparatus which is difficult to be caught up by an occupant compartment projection and is capable of improving an expansion performance.

A first aspect of the present invention is a head-protecting airbag apparatus where an airbag body inflated in a curtain shape is mounted in a folded state along a roof side rail across at least a center pillar, wherein an upper portion of the airbag body projects in an occupant compartment before expansion of a lower portion of the airbag body.

Accordingly, when the airbag is inflated, gas introduced into the airbag body from the upper portion inflates the upper portion and inflates the lower portion of the airbag body downwardly in the occupant compartment. At this time, since the airbag body is folded such that the upper portion is inflated earlier than the lower portion at the expansion time, the lower portion of the airbag body is pushed out by the upper portion which has projected in the occupant compartment. As a result, the lower portion of the airbag body with a pushed-out state is inflated and expanded towards a lower portion of the vehicle body. Therefore, the lower portion of the airbag body is moved downwardly at a position where it is spaced from such an occupant compartment projection as a slip joint. Accordingly, in a vehicle where there is the occupant compartment projection at an area where the airbag body is inflated, it becomes hard that the lower portion of the airbag body may be caught up by the occupant compartment projection during the expansion, thereby improving a expansion performance of the airbag body.

A second aspect of the invention is a head-protecting airbag apparatus where an airbag body inflated in a curtain shape is mounted in a folded state along a roof side rail across at least a center pillar, wherein the airbag body comprises:

an upper portion folded in a bellows shape; and
a lower portion subjected to one of turning-back performed toward an occupant compartment inner side and rolling-up performed towards the occupant compartment inner side.

According to this aspect, when the airbag body is inflated, the lower portion which has been subjected to the turning-back/rolling-up is pushed out inward the occupant compartment by the upper portion which has projected in the occupant compartment. Next, when the lower portion of the airbag body is turned back, the lower portion with a pushed-out state towards the occupant compartment inner side is inflated and expanded so as to pivot downwardly about the turned-back portion from the occupant compartment inner side towards an occupant compartment outer side. Therefore, the lower portion of the airbag body is moved downwardly at a position where it is spaced from such an occupant compartment projection as a slip joint inward the occupant compartment. That is, the lower portion is moved so as to cover the occupant compartment projection from an occupant compartment inner side. Alternatively, when the lower portion is rolled or folded in a rolling-up manner, the lower portion is unrolled downwardly from the occupant compartment inner side. As a result, the lower portion of the airbag body can easily ride over a occupant compartment projection such as a slip joint. Accordingly, in a vehicle where there is an occupant compartment projection at an area where the airbag body is inflated, it is hard that the lower portion of the airbag body is caught up by the occupant compartment projection during expansion, thereby improving expansion performance of the airbag body.

A third aspect of the invention can be configured in the second aspect such that the turning-back is performed so as to position a distal end portion of the airbag body on an upper face of the upper portion, it is performed so as to position the distal end portion on a occupant compartment inner side of the upper portion, or it is performed so as cover the upper portion from the occupant compartment inner side. The airbag body is thus turned back so that the upper portion folded in the bellows is substantially covered with the lower portion. As a result, in a stage where the airbag body is delivered prior to assembling the airbag body, a drawback is reduced that foreign matters are caught up into the bellows portion.

A fourth aspect of the invention can be structured in the second aspect such that the turning-back is performed so as to position a portion of the airbag body positioned below a turning-back line set at an intermediate portion, in a vertical direction, of the lower portion at the occupant compartment inner side and the rolling-up is performed upwardly from the turning-back line towards the occupant compartment inner side.

According to this aspect, when the airbag body is inflated, gas introduced into the airbag body from the upper portion inflates and expands the bellows portion of the upper portion of the airbag body approximately downwardly along a center pillar, and it inflates and expands the rolled portion of the airbag body downwardly in the occupant compartment. At this time, in the rolled-up portion, the roll is unrolled at first and then the turned-back portion which has been turned back upwardly is expanded downwardly so as to cover the center pillar from the above. As a result, even when there is an occupant compartment projection having a relatively large projection amount such as a slip joint at an area where the airbag body is inflated, the lower portion of the airbag body is inflated and expanded so as to cover the occupant compartment projection. Accordingly, the lower portion of the airbag body is prevented from being caught up by the occupant compartment projection having a relatively large projection amount, thereby improving further the expansion performance of the airbag body.

According to a fifth aspect of the invention, in the fourth aspect, the turning-back line is set above a predetermined occupant compartment projection disposed at the occupant compartment inner side of the pillar.

According to this aspect, in addition to the operation of the fourth aspect, when the airbag body is inflated, the roll of the rolled portion of the airbag body is unrolled at a position above a predetermined occupant compartment projection, for example a slip joint, disposed at an occupant compartment inner side of the center pillar, and thereafter the turned-back portion is expanded downwardly from this position so as to cover the center pillar from the above. As a result, the turned-back portion of the airbag body is necessarily inflated and expanded during expansion so as to cover the predetermined occupant compartment projection disposed the occupant compartment inner side. Therefore, the lower portion of the airbag body can securely be prevented to be caught up by the predetermined vehicle occupant compartment projection.

A sixth aspect of the invention is structured in the second aspect such that the upper portion is provided with a gas introducing path formed substantially linearly along the roof side rail on only a region corresponding to a portion of the airbag body positioned below the roof side rail, and one end of the gas introducing portion communicating with an inflator, and the airbag body formed only in its area positioned below the roof side rail with a plurality of inflating chambers communicating with the gas introducing path, wherein the airbag body is double folded or is not folded at the gas introducing path.

According to this aspect, in addition to the configuration of the second aspect, the gas introducing path is formed generally linearly along the roof side rail and the gas introducing path is double folded or it is not folded. As a result, since a gas flow resistance is reduced at the gas introducing path when the airbag body is expanded, gas flow from the inflator is made smooth, so that a time period lapsing until expansion of the airbag body is completed is not prolonged even at a side of the airbag which is farther from the inflator and it can be shortened.

Also, according to this aspect, since it is unnecessary to accommodate the duct 406 over the front pillar and the roof side rail, which is required in the conventional art (refer to FIG. 21), the mounting convenience of the airbag body can be improved. Furthermore, since the gas introducing path of the airbag body is formed at only a region corresponding to the roof side rail and the plurality of the inflating chambers are formed at only a region positioned below the roof side rail, the gas introducing path and the plurality of inflating chambers of the bulky airbag body can easily be accommodated in the roof side rail portion where an accommodating space for the airbag body can be secured easier than the front pillar portion. At this point, the mounting convenience of the airbag body can also be improved.

A seventh aspect is structured in the sixth aspect such that the inflator is disposed at a portion of a vehicle body which is positioned rearward a center pillar, and a cut-out portion is formed at a portion of the airbag body which inflates downward of the front pillar.

According to this aspect, since the cut-out portion is formed at a portion of the vehicle body which is far from the inflator and expanded downward of the front pillar, a volume of this portion of the folded airbag body is reduced. As a result, it becomes possible to accommodate a front portion of the airbag body even at a portion with a small accommodating space formed between the front pillar and a front pillar garnish.

An eighth aspect is structured in the sixth aspect such that the portion of the airbag body other than the gas introducing path is disposed in parallel with the gas introducing path on the occupant compartment inner side.

According to this aspect, when the inflator is actuated, the gas introducing path is first inflated and the portion of the airbag body other than the gas introducing path is moved toward the occupant compartment inner side. As a result, the airbag is expanded in the curtain shape while the portion of the airbag body other than the gas introducing path is rapidly being inflated toward the occupant compartment inner side. For this reason, when the airbag body is expanded, it is prevented from being caught up by the occupant compartment projection such as a slip joint projecting from the center pillar inward of the occupant compartment.

A ninth aspect is structured in the sixth aspect such that the inflator is disposed at a lower portion of the pillar, and the gas introducing path and the inflator are connected to each other through a gas guide tube.

According to this aspect, in addition to the structure of the sixth aspect, the inflator can be disposed at the lower portion of the pillar, for example, a lower portion of a front pillar or a lower portion of a rear pillar, and the volume of a portion of the folded airbag body accommodated in the pillar disposed with the inflator is reduced. As a result, the mounting conveniences of both the inflator and the airbag body are improved.

A tenth aspect is structured in the sixth aspect such that a spherical. portion having an sectional area larger than that of the gas introducing path is formed at a downstream end portion of the gas introducing path.

According to this aspect, in addition of the contents of the sixth aspect, when gas from the inflator reaches the downstream end portion of the gas introducing path, its pressure is reduced at the spherical portion having the larger sectional area from the gas pressure at the other portion of the gas introducing path. As a result, the downward end portion of the gas introducing path can be prevented from being injured due to the gas pressure.

An eleventh aspect of the invention is a head-protecting airbag apparatus where an airbag body inflated in a curtain shape is mounted in a folded state along a roof side rail across at least a center pillar, wherein the airbag body comprises:

a gas introducing path which is formed generally linearly along the roof side rail in only a region positioned below the roof side rail and whose one end communicates with an inflator; and a plurality of inflating chambers which are formed only in a region positioned below the roof side rail and whose one ends communicate with the gas introducing path;

wherein one of non-folding and a double folding along the gas introducing path is effected on the gas introducing path of the airbag body.

According to this aspect, since it is unnecessary to accommodate the duct 406 over the front pillar and the roof side rail, which is required in the conventional art (refer to FIG. 21), the mounting convenience of the airbag body can be improved. Furthermore, since the gas introducing path of the airbag body is formed at only a region positioned below the roof side rail and the plurality of the inflating chambers are formed at only a region positioned below the roof side rail, the gas introducing path and the plurality of inflating chambers of the bulky airbag body can easily be accommodated in the roof side rail portion where an accommodating space for the airbag body can be secured easier than the front pillar portion. At this point, the mounting convenience of the airbag body can also be improved.

Furthermore, the gas introducing path is formed substantially linearly along the roof side rail and the gas introducing path is double folded or it is not folded. As a result, since a gas flow resistance is reduced at the gas introducing path when the airbag body is expanded, gas flow from the inflator is made smooth, so that a time period lapsing until expansion of the airbag body is completed is not prolonged even at a side of the airbag which is farther from the inflator and it can be shortened.

A twelfth aspect of the invention is a head-protecting airbag apparatus where an airbag body expanding in a curtain shape is disposed in a folded state along a roof side rail across at least a center pillar, comprising:

the airbag body including at least one of a bellows-folded portion and a rolled-up portion, provided at its upper portion with a generally linear gas introducing path formed in only a region positioned below the roof side rail, and provided with a plurality of inflating chambers whose upper portions communicating with the gas introducing path and which extend generally downwardly;

an inflator for generating gas;

a gas guide tube for connecting the gas introducing path and the inflator to each other;

a guide member for guiding the airbag body when the airbag inflates and;

straps, one ends of which are respectively connected to a lower and front end and a lower and rear end of the airbag body, the other ends thereof being fixed to portions of a vehicle body.

DETAILED DESCRIPTION OF THE PREFERRED EMBODIMENTS

Figure 1:
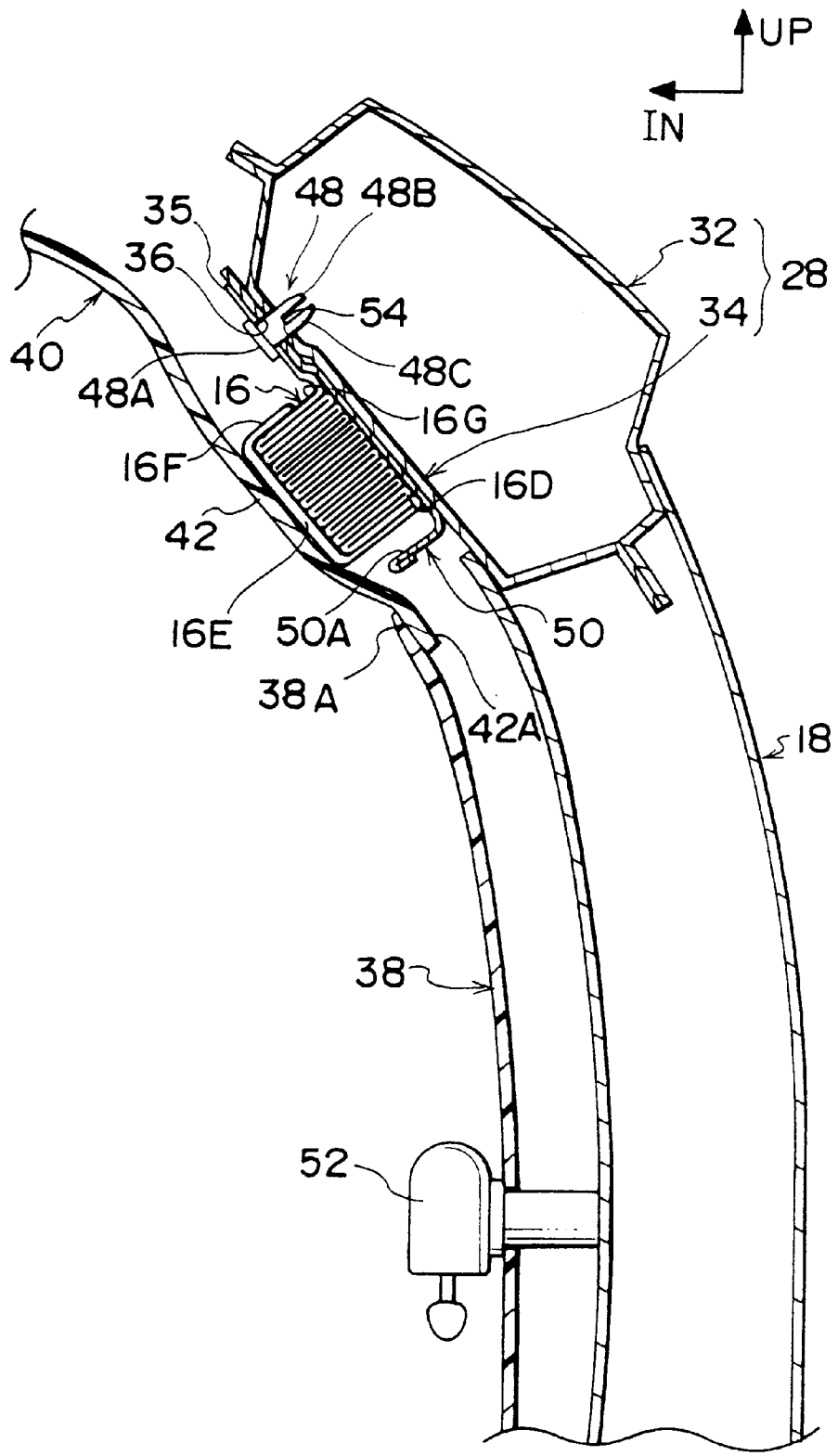
FIG. 1 is an enlarged sectional view showing an airbag body of a head-protecting airbag apparatus according to a first embodiment of the present invention and taken along a line I—I in FIG. 1.

A first embodiment of a head-protecting airbag apparatus of the present invention will be explained with reference to FIGS. 1 to 4.

In the drawings, arrow FR indicates the vehicle forward direction, arrow UP indicates the vehicle upward direction, and arrow IN indicates the vehicle transverse inner side direction.

Figure 3:
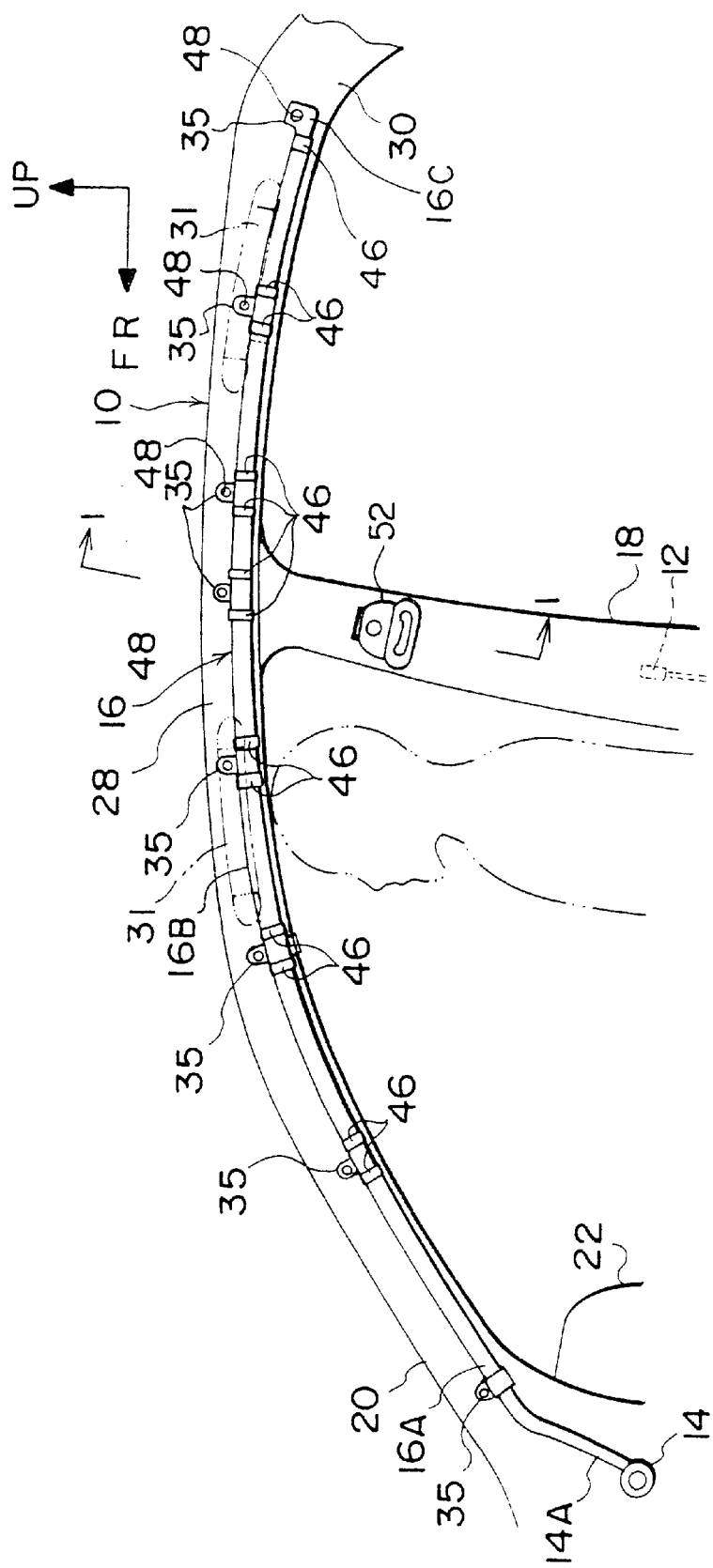
FIG. 3 is a schematic side view showing an accommodated state of the airbag body of the head-protecting airbag apparatus according to the first embodiment of the invention.

As shown in FIG. 3, an head-protecting airbag apparatus 10 of this embodiment is configured with a sensor 12 for detecting a side collision state, a cylindrical inflator 14 injecting gas when actuated, and an airbag body 16 as main component. The sensor 12 is disposed at a center pillar (B pillar) 18 near its lower portion, and it detects a side collision state when a side collision load of a predetermined value or more acts on a vehicle body side portion.

The inflator 14 is disposed in the vicinity of a connected portion between a front pillar (A pillar) 20 and a dashboard 22 and it is connected to the sensor 12. Accordingly, when the sensor 12 detects a side collision, the inflator 14 is actuated.

Figure 4:
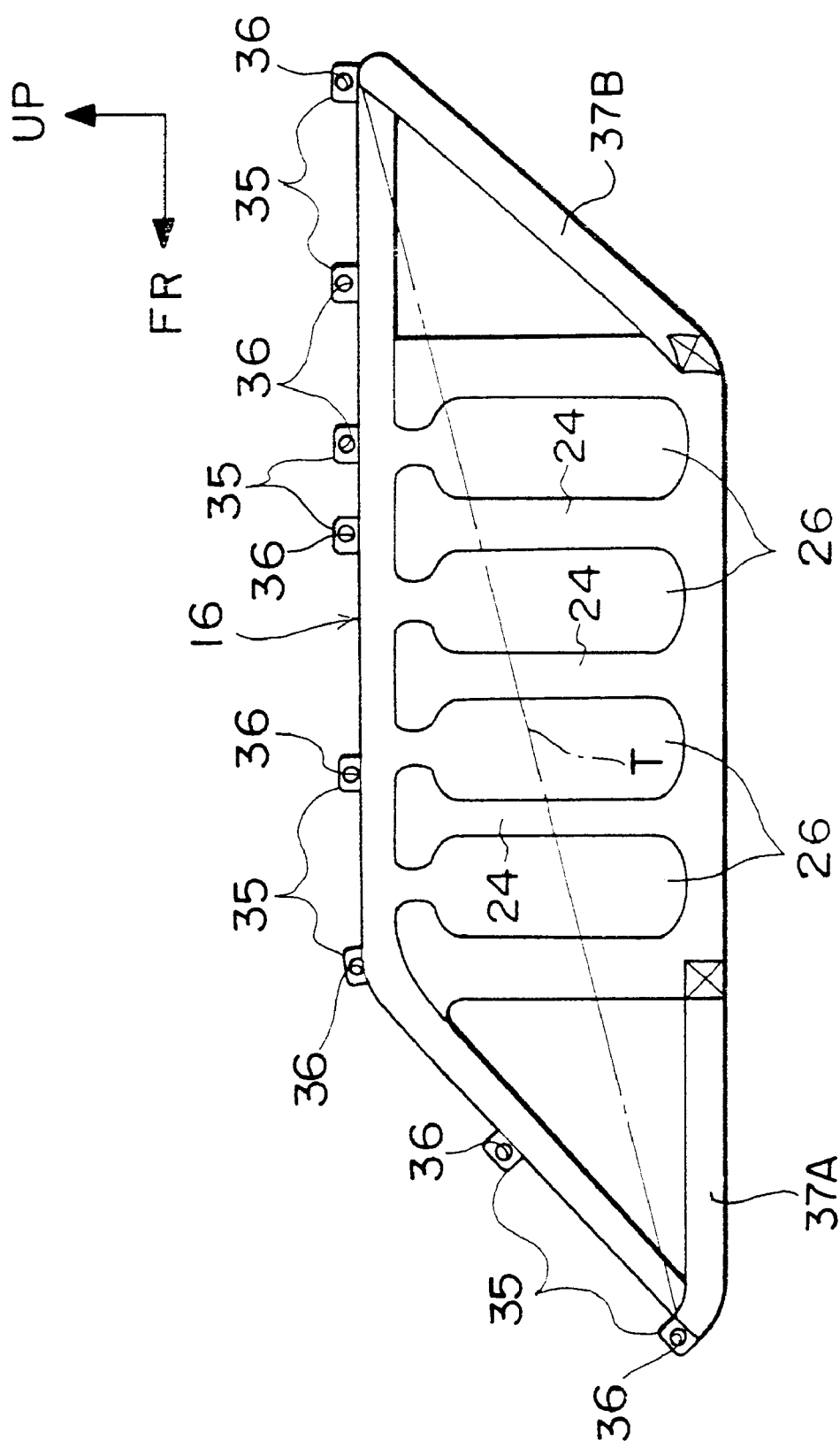
FIG. 4 is a schematic side view showing a expanded state of the airbag body of the head-protecting airbag apparatus according to the first embodiment of the invention.

As shown in FIG. 4, a plurality of non-inflatable portions 24 extending across a tension line T connecting a fixed front end point and a fixed rear end point and the airbag body 16, a longitudinal direction of each non-inflatable portion corresponding to a vertical direction, are formed at predetermined intervals in a vertical direction intermediate portion of the airbag body 16 in a side view, and a plurality of inflatable portions approximately parallel to each other and extending across the tension line T when the airbag body is expanded are formed between the adjacent non-inflatable portions.

As shown in FIG. 3, an front end portion 16A of the airbag body 16 communicates with a conduit 14A connected to a front end portion of the inflator 14. An intermediate portion 16B of the airbag body 16 is disposed along the front pillar 20 and a roof side rail 28, and a rear end portion 16C of the airbag body 16 is disposed such that its upper edge portion is positioned in the vicinity of a quarter pillar (C pillar) 30. Also, a front pillar garnish (not shown) and a roof head lining 40 (refer to FIG. 1) are disposed on an occupant compartment inner side of the airbag body 16 which has been folded in an almost vertical direction to form an elongated shape and the airbag body 16 pushes to open the front pillar garnish and the roof head lining 40 and expands. In FIG. 3, reference numeral 31 designates an assist grip.

As shown in FIG. 4, the airbag body 16 is formed of a base cloth and provided with tongue-shaped mounting portions 35. These mounting portions 35 are formed at their almost central portions with circular holes 36. The airbag body 16 is fixed on the front pillar 20 and the roof side rail 28 through the mounting holes 36 by fixing means such as grommets 48 (refer to FIGS. 1,2) described later. Each pitch between the adjacent mounting holes 36 is longer than that between each adjacent mounting holes provided on a vehicle body, and it is set so as to be capable of covering the front pillar 20 and the roof side rail 28 without clearance, when the airbag is expanded. Also, one end (a rear end), in a longitudinal direction, of a strap 37A is fixed by sewing to a lower and front end portion of the airbag body 16. The strap 37A extends forward and the other end (a front end) of the strap 37A is fixed to a vehicle body. Furthermore, one end (a front end), in a longitudinal direction, of a strap 37B is fixed by sewing to a lower and rear end portion of the airbag body 16. The strap 37B extends rearward and the other end (a rear end) of the strap 37A is fixed to a vehicle body. These straps 37A, 37B are fixed to the vehicle body in the following manner. Each of the other ends of the strips 37A, 37B is formed with a mounting hole. The mounting hole of the other end of the strap 37A is positioned on the mounting hole 36 of the foremost mounting portion 35 of the airbag body 16. Next, two metal plates each having a mounting hole corresponding to the mounting hole of the strap 37A sandwich the other end of the strap 37A and the foremost mounting portion 35 of the airbag body 16. Such a bolt as a fixing member is inserted into these mounting holes in the sandwiched state of the other end of the strap 37A and the foremost mounting portion 35 between the metal plates, so that the other end of the strap 37A, the foremost mounting portion 35, and the two metal plates are fixed to a predetermined portion of the vehicle body. Thus, the strap 37A is securely fixed to the vehicle body. Also, fixing of the other end of the strap 37B to the vehicle body is performed like the case of the strap 37A. It is to be noted that in this embodiment each of the straps 37A, 37B is fixed together with a corresponding mounting hole 35 to the vehicle body but each of the straps 37A, 37B is fixed independently or separately from the mounting hole 35 to the vehicle body.

As shown in FIG. 1, the roof side rail 28 is formed in a closed sectional configuration by an outer panel 32 disposed on an occupant compartment outer side and an inner panel 34 disposed on an occupant compartment inner side. Alternatively, a reinforcement can be disposed between the outer panel 32 and the inner panel 34.

Figure 2:
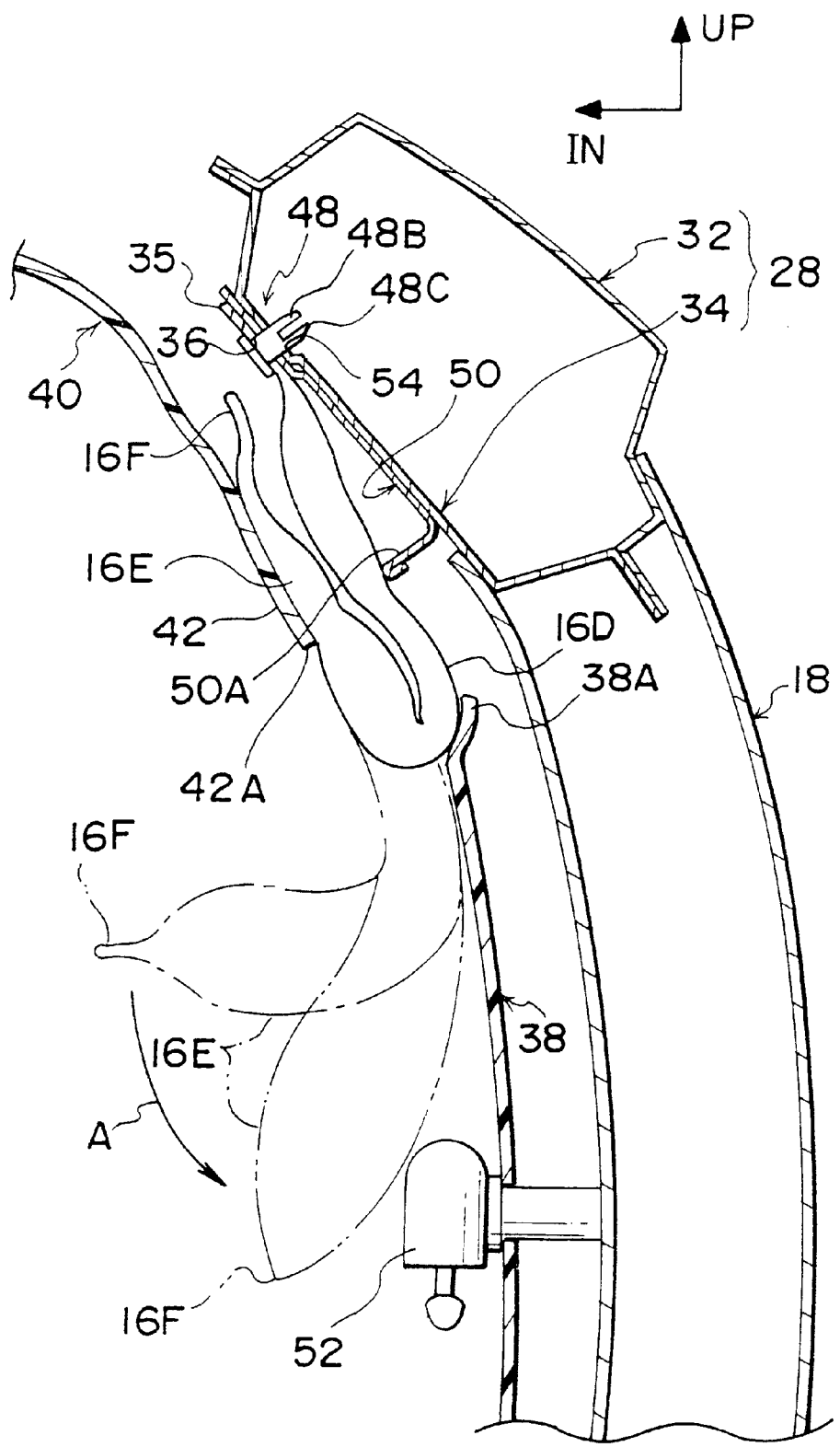
FIG. 2 is a view for explaining an operation of the airbag body of the head-protecting airbag apparatus according to the first embodiment of the invention.

A vehicle transverse direction outer edge portion 42 of a roof head lining 42 made of resin is disposed on an occupant compartment inner side of the inner panel 34 of the roof side rail 28. The vehicle transverse direction outer edge portion 42 of the roof head lining 40 deforms inward the occupant compartment to open, when the airbag body is expanded, as shown in FIG. 2. In an ordinary state where the airbag body 16 is accommodated, an end portion 42A of a vehicle transverse direction outer side edge portion 42 of the roof head lining 40 is engaged with a vehicle occupant compartment outer surface of an upper edge portion 38A of a center pillar garnish 38 disposed on a vehicle occupant compartment outer side of the center pillar 38A. Also, a slip joint 52 of a seatbelt system which is a occupant compartment (vehicle interior) inner protrusion is disposed on the center pillar 18 so as project in the occupant compartment through the center pillar garnish 38.

As shown in FIG. 1, an upper portion 16D of the airbag body 16 is folded generally downwardly in a bellows shape, and a lower portion 16E thereof is turned back inward the occupant compartment. A distal end 16F of the lower portion 16E reaches an upper face portion 16G of the upper portion 16D.

In each mounting portion 35 of the airbag body 16, the grommet 48 is inserted into the mounting hole 36 and the airbag body 16 is fixed on the inner panel 34 of the roof side rail 28 by the grommet 48. Also, a jump stand 50 serving as a guide member for guiding the airbag body 16 in the vehicle occupant compartment inner direction is disposed between the airbag body 16 and the inner panel 34 at a portion of the inner panel 34 positioned above the center pillar 18. The jump stand 50 is also fixed on the inner panel 34 of the roof side rail 28 by the grommet 48. In this embodiment, the grommet 48 is used as a fixing member (engaging member), but a bolt or the like can be used instead of the grommet.

The jump stand 50 is formed in an almost L-shaped sectional configuration and it is formed at its lower end portion with a guide portion 50A. Accordingly, when the airbag body 16 is expanded, as shown in FIG. 2, the airbag body 16 is guided in the vehicle transverse inner side direction by the guide portion 16A so that it is expanded at a vehicle transverse inner side of an upper edge portion 38A of the center pillar garnish 38. It is to be noted that the grommet 48 is configured with a disk-like head 48A and a pair of leg portions 48B, 48C extending in parallel with each other at a central portion of the head portion 48A. The pair of leg portions 48B, 48C are elastically deformable in directions approaching to and separating from each other. On the other hand, engaging holes 54 are formed in the inner panel 34 of the roof side rail 28. When the leg portions 48B, 48C are inserted into each engaging hole 54, they are pressed so as to approach to each other, and the grommet 48 is engaged with the inner panel 34 by reaction force of the leg portions 48B, 48C after it is inserted.

As shown in FIG. 3, the airbag body 16 is held in a folded by ting tapes 46 around the airbag body 16 at predetermined intervals, and each tape 46 is easily broken or ruptured when the airbag body 16 is inflated.

Next, operation of this embodiment will be explained.

In the embodiment, when the sensor 12 detects a side collision, the inflator 14 is actuated, the airbag body 16 is inflated out, and it begins to expand in the vehicle transverse inner side direction. At this time, since the lower portion 16E of the airbag body 16 is turned back on the vehicle transverse inner side of the upper portion 16D which is folded in the bellows, as shown with a solid line in FIG. 2, the lower portion 16E of the airbag body 16 which has been turned back is pressed out by the upper portion 16D which has been projected prior to the lower portion 16E. As a result, the lower portion 16E of the airbag 16 which has been pressed in the vehicle transverse side direction is inflated and expanded rotatably in the vehicle downward direction (arrow A in FIG. 2), as shown with a double dotted line in FIG. 2. For this reason, the lower portion 16E of the airbag body 16 is moved downwardly so as to cover the slip joint 52 from the above at a position spaced from the slip joint 52 (which is a vehicle occupant compartment inner side protrusion) in the vehicle transverse inner side direction.

Accordingly, as shown with a double dotted line in FIG. 2, in a vehicle in which there is a vehicle occupant compartment inner side protrusion such as a slip joint 52 or the like at a portion where the airbag body 16 is expanded, it is hard for the lower portion 16E of the airbag body 16 to be caught up by the vehicle occupant compartment inner side protrusion, so that a expanding performance of the airbag body 16 can be improved.

Also, in the airbag body 16 which has been put in the folded state, the lower portion 16E of the airbag body 16 has been turned back on the vehicle transverse inner side, so that it covers the upper portion 16D which has been folded in the bellows. As a result, in a transportation stage of the airbag body 16 prior to assembling the same in a vehicle, a drawback can be reduced in which a foreign matter enters to be held in the bellows portion of the airbag body 16.

In this embodiment, the distal end 16F of the lower portion 16E of the airbag body 16 reaches an upper face portion 16G of the upper portion 16D, but instead of this arrangement, the distal end 16F can be positioned before the upper face portion 16G.

A second embodiment of the head-protecting airbag apparatus of the present invention will be explained with reference to FIGS. 5 to 7.

In the second embodiment, the same reference numerals are given to the same parts or members in the first embodiment, and description thereof will be omitted.

Figure 5:
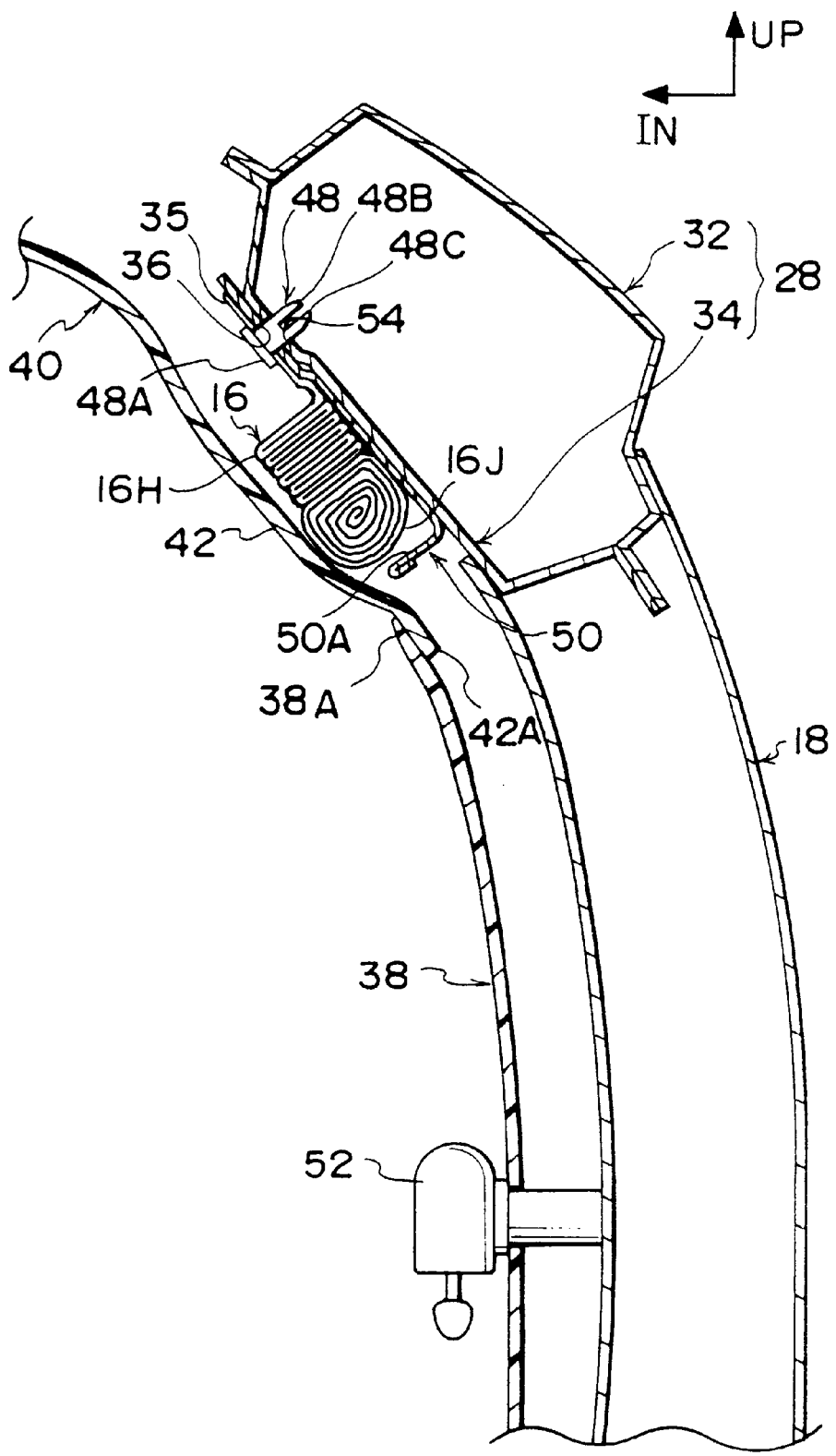
FIG. 5 is a sectional view of an airbag body of a head-protecting airbag apparatus according to a second embodiment of the present invention, which corresponds to FIG. 1.

As shown in FIG. 5, in this embodiment, an upper portion 16H of the airbag body 16 is folded generally downward in a bellows, and an lower portion 16J is folded in a rolled shape towards the vehicle transverse inner side, i.e., such that a rolling-up-in side corresponds to the vehicle transverse inner side direction.

Figure 6:
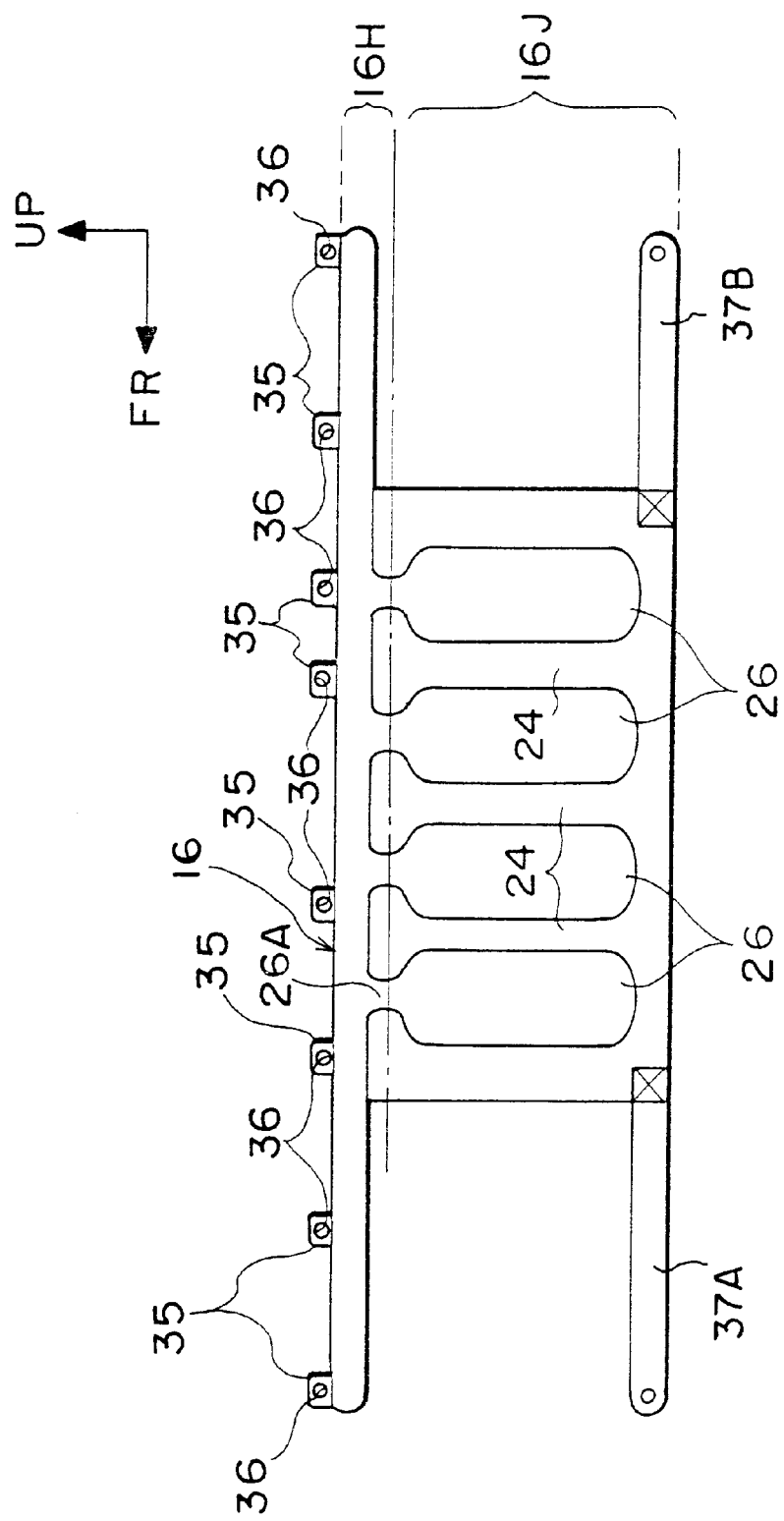
FIG. 6 is a schematic side view of the airbag body of a head-protecting airbag apparatus according to a second embodiment of the present invention before folded.

As shown in FIG. 6, in the airbag body 16, an upper portion positioned above a neck portion 26A formed at an upper ends of the inflatable portions 26 is folded in a bellows, and a relatively wide portion below the neck portion 26A is folded in a rolled shape. Straps 37A, 37B of this embodiment are fixed to the vehicle body similarly to the first embodiment. That is, one end (a rear end), in a longitudinal direction, of the strap 37A is fixed by sewing to a lower and front end portion of the airbag body 16. The strap 37A extends forward and the other end (a front end) of the strap 37A is fixed to a vehicle body. Furthermore, one end (a front end), in a longitudinal direction, of the strap 37B is fixed by sewing to a lower and rear end portion of the airbag body 16. The strap 37B extends rearward and the other end (a rear end) of the strap 37A is fixed to a vehicle body. These straps 37A, 37B are fixed to the vehicle body in the following manner. Each of the other ends of the strips 37A, 37B is formed with a mounting hole. The mounting hole of the other end of the strap 37A is positioned on the mounting hole 36 of the foremost mounting portion 35 of the airbag body 16. Next, two metal plates each having a mounting hole corresponding to the mounting hole of the strap 37A sandwich the other end of the strap 37A and the foremost mounting portion 35 of the airbag body 16. Such a bolt as a fixing member is inserted into these mounting holes in the sandwiched state of the other end of the strap 37A and the foremost mounting portion 35 between the metal plates, so that the other end of the strap 37A, the foremost mounting portion 35, and the two metal plates are fixed to a predetermined portion of the vehicle body. Thus, the strap 37A is securely fixed to the vehicle body. Also, fixing of the other end of the strap 37B to the vehicle body is performed like the case of the strap 37A. It is to be noted that in this embodiment each of the straps 37A, 37B is fixed together with a corresponding mounting hole 35 to the vehicle body but each of the straps 37A, 37B is fixed independently or separately from the mounting hole 35 to the vehicle body.

Next, operation of this embodiment will be explained.

In this embodiment, when the sensor 12 detects a side collision, the inflator 14 is actuated, the airbag body 16 is inflated out, and it begins to expand in the vehicle transverse inner side direction. At this time, since the upper portion 16H of the airbag body 16 is folded downward in the bellows and the lower portion 16J is folded toward the vehicle transverse inner side in the rolled shape, as shown with a solid line in FIG. 7, the upper portion 16H which has been folded in the bellows inflates to press and open an vehicle transverse outer side edge portion 42 of the roof head lining 40 in the vehicle occupant compartment inner side. Thereafter, as shown with a dotted chain line in FIG. 7, the lower portion 16J of the airbag body 16 which has been folded in the rolled shape is expanded downwardly during expansion.

Figure 7:
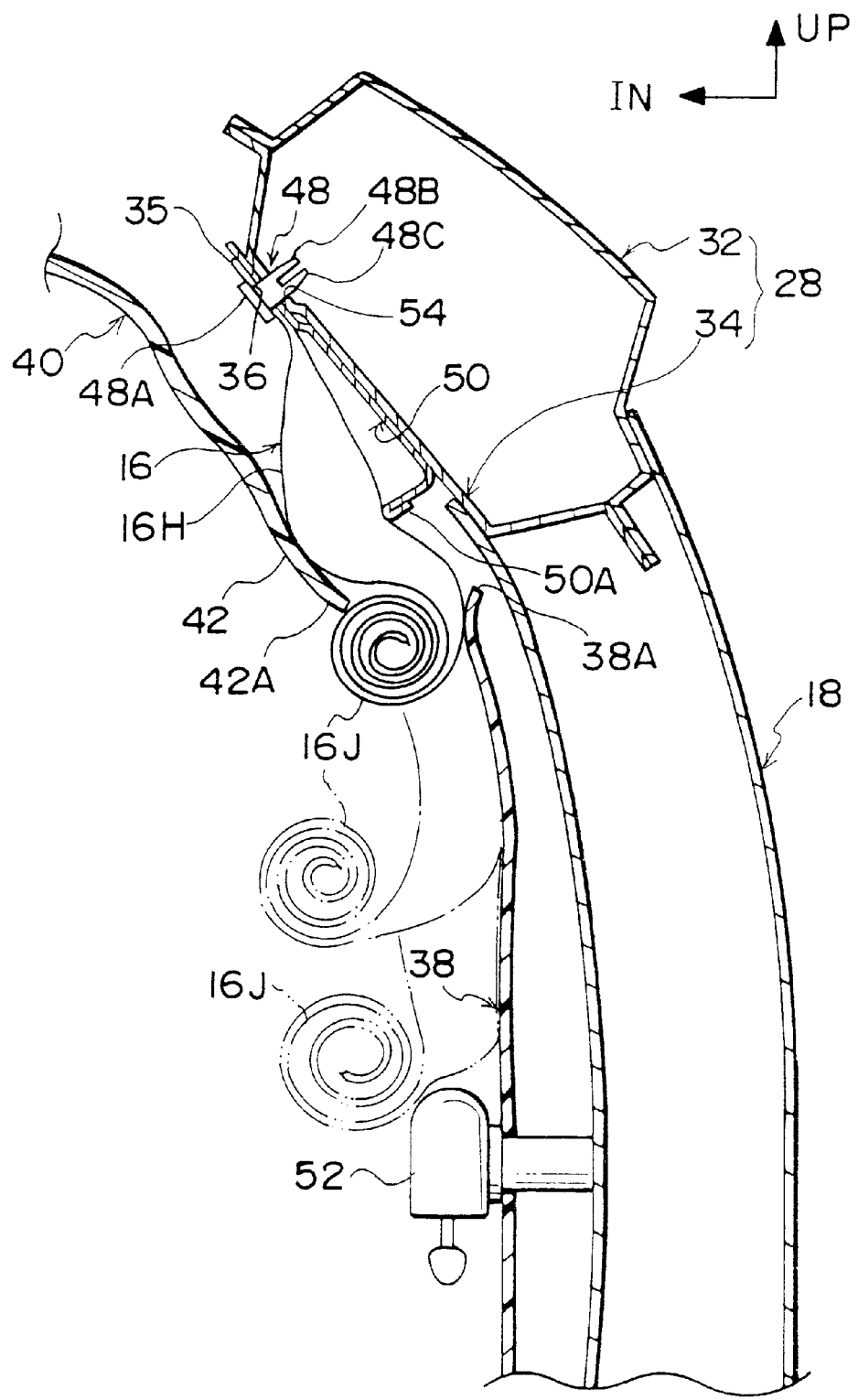
FIG. 7 is a view for explaining an operation of the airbag body of the head-protecting airbag apparatus according to the second embodiment of the invention.
Figure 8:
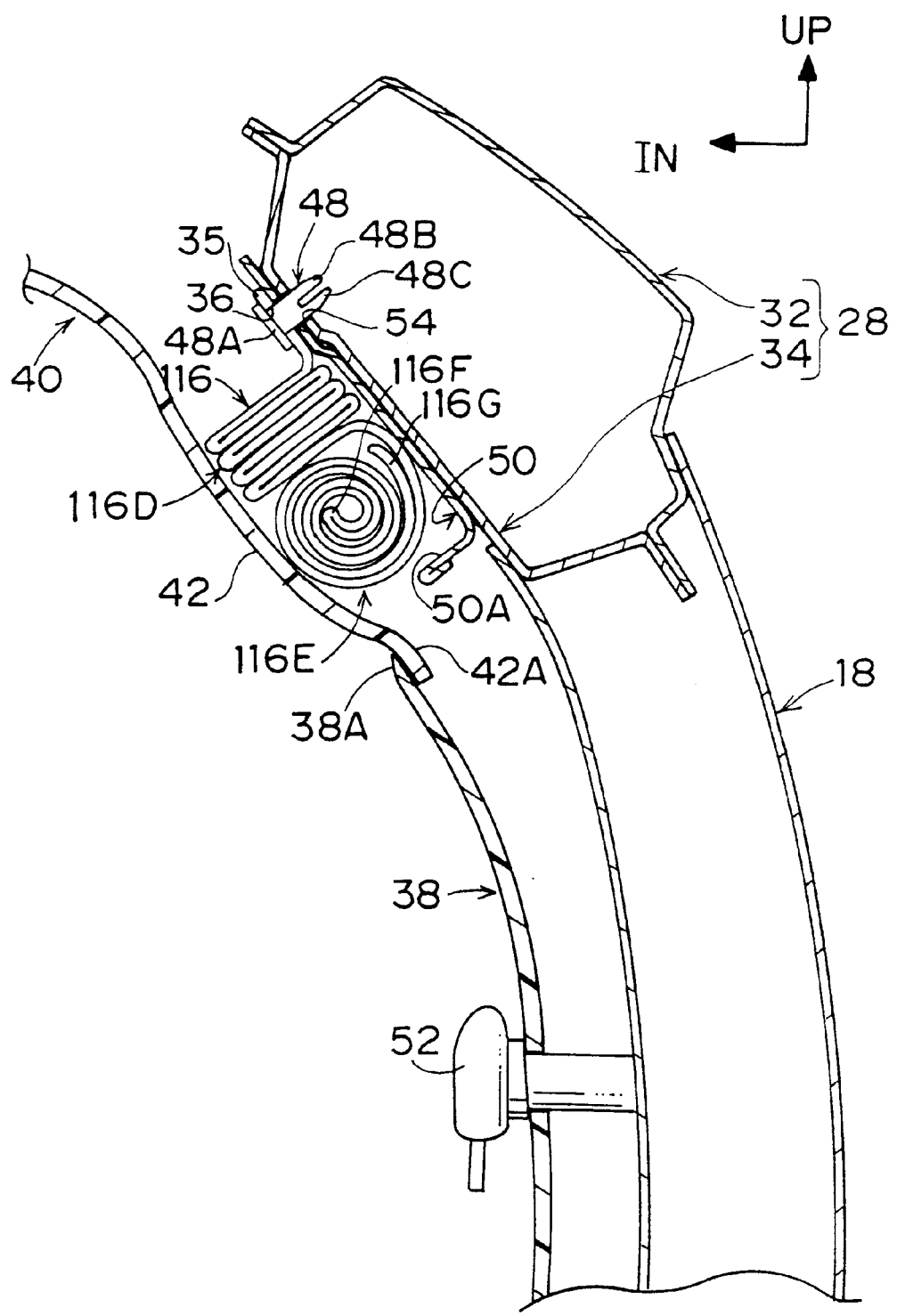
FIG. 8 is an enlarged sectional view of the airbag body of the head-protecting airbag apparatus according to a third embodiment of the invention, which corresponds to FIG. 1.

At this time, as the lower portion 16J of the airbag body 16 has been folded toward the vehicle occupant compartment inner side in the rolled shape, as shown with a double dotted chain line in FIG. 7, the lower portion 16J can easily ride beyond a vehicle occupant compartment inside protrusion such as a slip joint 52 or the like. As a result, it is hard for the lower portion 16J of the airbag body 16 to be caught up by the vehicle occupant compartment inside protrusion during its expansion, so that a expanding performance of the airbag body 16 can be improved.

Also, in the airbag body 16 which has been put in the folded state, since the width of the upper portion 16H which has been folded in the bellows is relatively small, a drawback can be reduced in which a foreign matter enters to be held in the bellows portion of the airbag body 16 in a transportation stage of the airbag body 16 prior to assembling the same in a vehicle.

The head-protecting airbag apparatus 10 of the second embodiment is also applicable to a structure where an inflator is disposed at a quarter pillar side (C pillar) 30 like an embodiment described later.

Next, a third embodiment will be explained with reference to FIGS. 8 to 10B. In the third embodiment, the same reference numerals are given to the same parts or members in the first embodiment, and description thereof will be omitted.

Figure 10A:
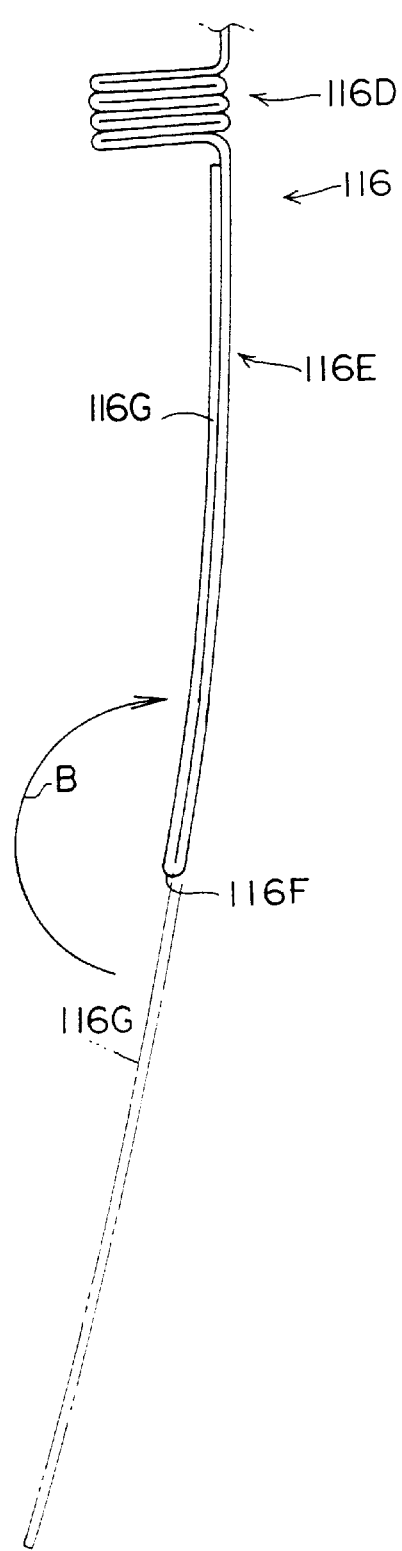
FIG. 10A is a sectional view showing one step of a folding process of the airbag body of the head-protecting airbag apparatus according to the third embodiment of the invention.
Figure 10B:
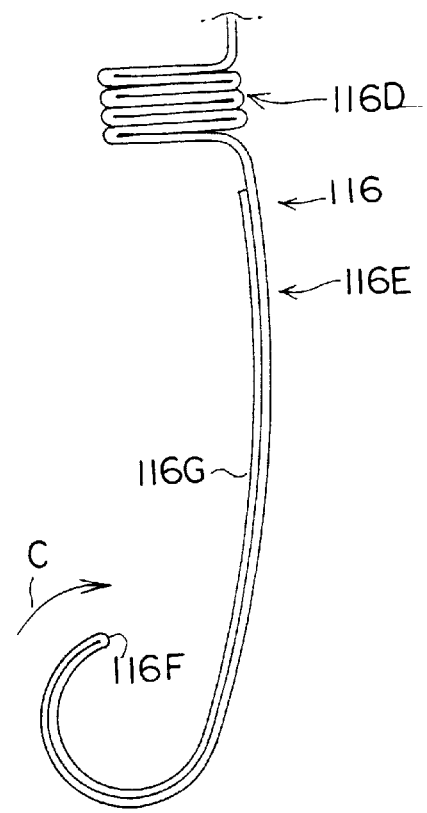
FIG. 10B is a sectional view showing a step next to the one step of the folding process of the airbag body of the head-protecting airbag apparatus according to the third embodiment of the invention.

As shown in FIG. 10A, an upper portion of an airbag body 116 is formed generally downward in a bellows shape, i.e., a bellows-folded portion 116D. Also, a portion positioned below the bellows-folded portion 116D in the airbag bag 116 is formed in a rolled-up portion 116E. A lower turned-back portion 116G of the rolled-up portion 116E is turned in the vehicle transverse inner side direction back at a turned-back line 116F set at almost a central portion in a vertical direction and extending in a longitudinal direction of a vehicle, and it is then folded in a rolled shape from the turned-back line 116F in the vehicle occupant compartment inner side direction (in a direction of arrow C in FIG. 10B) so as to roll in the turned-back line 116F, as shown in FIG. 10B, so that the airbag body 116 is formed in a folded configuration shown in FIG. 8.

Figure 9:
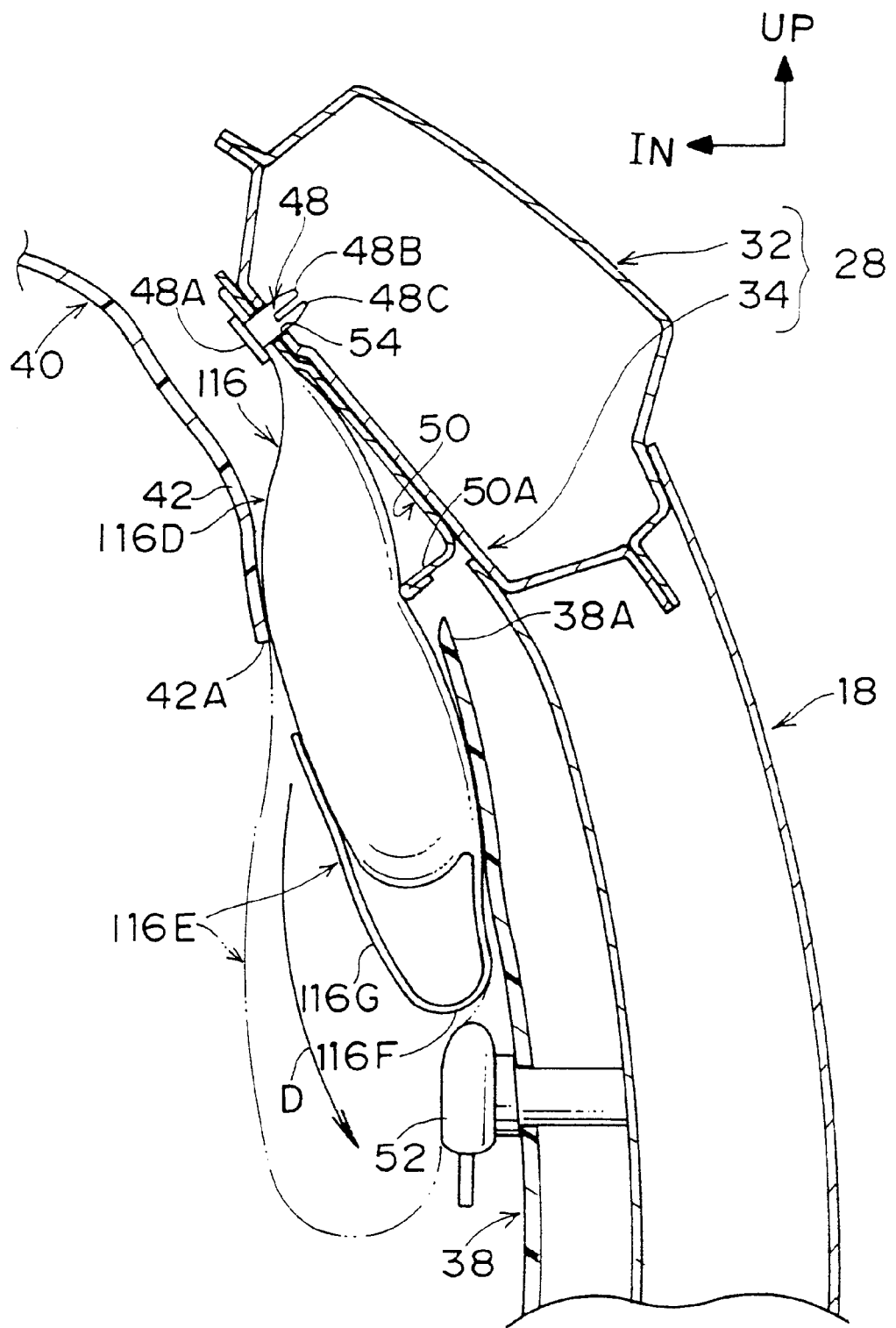
FIG. 9 is a view for explaining an operation of the airbag body of the head-protecting airbag apparatus according to the third embodiment of the invention.

As shown in FIG. 9, in this embodiment, the turned-back line 116F in the rolled-up portion 116E of the airbag body 116 is set at a position above the slip joint 52 which is a predetermined vehicle occupant compartment inside protrusion. Also, the other configuration of this embodiment is similar to the first embodiment and explanation thereof is omitted.

Next, operation of this embodiment will be explained.

In this embodiment, when the sensor 12 detects a side collision, the inflator 14 is actuated, so that the airbag body 116 is inflated and expanded. In this case, gas entering in the airbag body 116 from the upper portion thereof inflates to expand the bellows-folded portion 116D of the airbag body 116. At this time, as the bellows-folded portion 116D of the airbag body 116 is folded generally downwardly in the bellows shape, a expanding direction of the airbag body 116 can be restricted in a direction along a vehicle occupant compartment inner side face of the B pillar garnish 38.

Next, gas entering in the airbag body 116 inflates to expand the roll-upportion 116E of the airbag body which has been folded in the rolled-up shape in the vehicle downward direction.

At this time, in this embodiment, since the lower turned-back portion 116G in the rolled-up portion 116E of the airbag body 116 is turned back in the vehicle occupant compartment inner side direction (in a direction of arrow B in FIG. 10A) at the turning-back line 116F set almost at a central portion in the vertical direction and extending in the longitudinal direction of the vehicle, as shown in FIG. 10A, and, as shown in FIG. 10B, the rolled-up portion 116D is folded in the vehicle occupant compartment inner side direction (in a direction of arrow B in FIG. 10B), the rolled-up portion 116E of the airbag body 116 is first unrolled and thereafter the turned-back portion 116G inflates and expands downwardly so as to cover the slip joint 52 from the above, as shown with arrow D and a double dotted chain line in FIG. 9.

Furthermore, in this embodiment, since the turned-back line 116F in the rolled-up portion 116E of the airbag body 116 is set at the position above the slip joint 52, the turned-back portion 116G of the airbag body 116 necessarily inflates to expand so as to cover the slip joint 52 from the above.

As a result, even if there is a relative large slip joint 52 at an area where the airbag body 116 expands, the lower portion of the airbag body 116 can securely be prevented from being caught up by the slip joint 52 during expansion of the airbag body 116. Thus, an expanding performance of the airbag body 116 can further be improved as compared with the first embodiment.

In this embodiment, the turned-back line 116F in the rolled-up portion 116E of the airbag body 116 is set above the slip joint 52, but it can be set above another vehicle occupant compartment inside protrusion instead of the slip joint 52. Also, the head-protecting airbag apparatus of this embodiment is applicable to a head-protecting airbag apparatus for protecting the heads of both front and rear seat occupants.

A fourth embodiment of the head-protecting airbag apparatus of the present invention will be explained with reference to FIGS. 11 through 15. In the fourth embodiment, the same reference numerals are given to the same parts or members in the first embodiment, and description thereof will be omitted.

Figure 11:
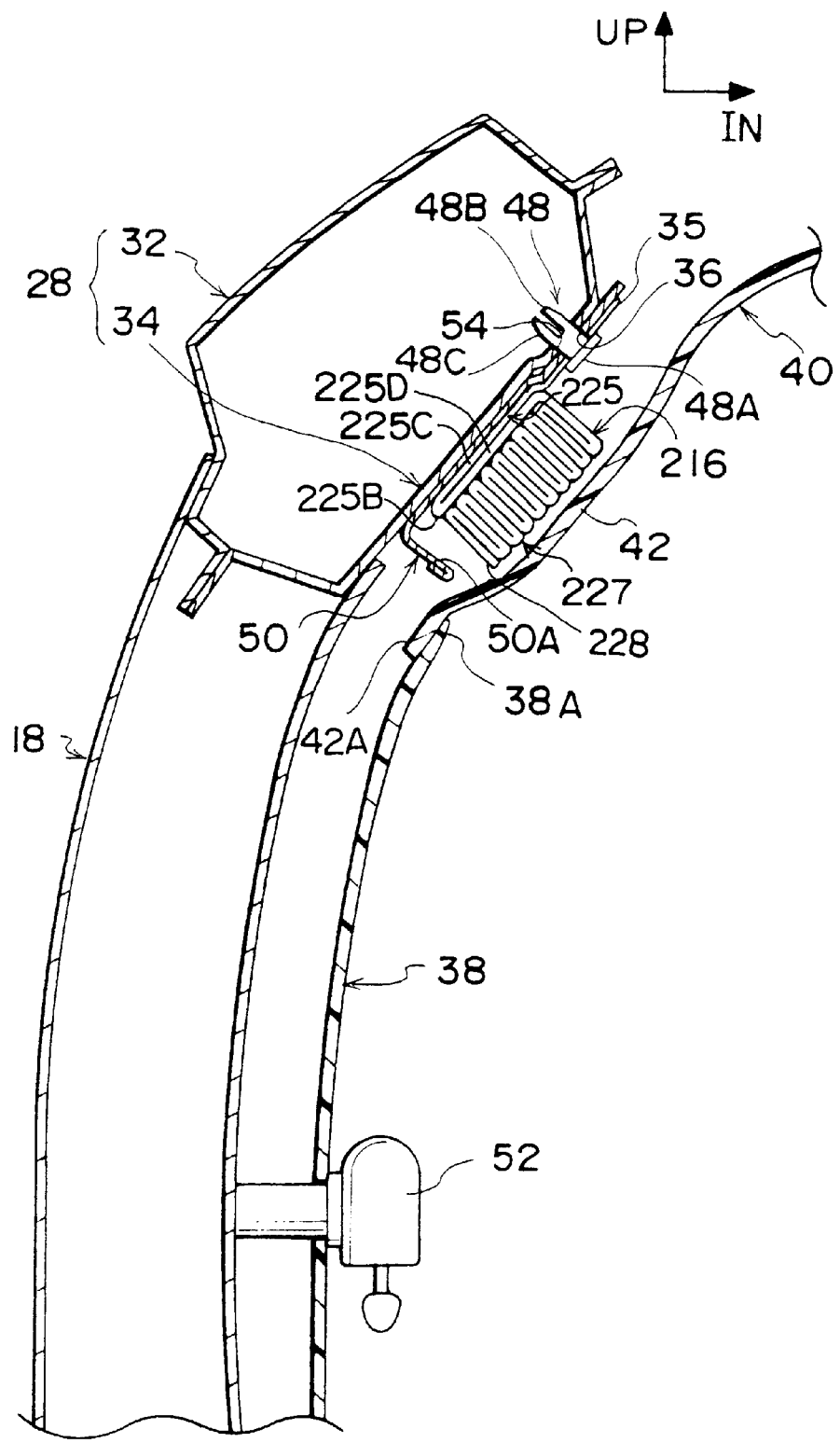
FIG. 11 is an enlarged sectional view of a head-protecting airbag apparatus of a fourth embodiment of the invention.
Figure 14:
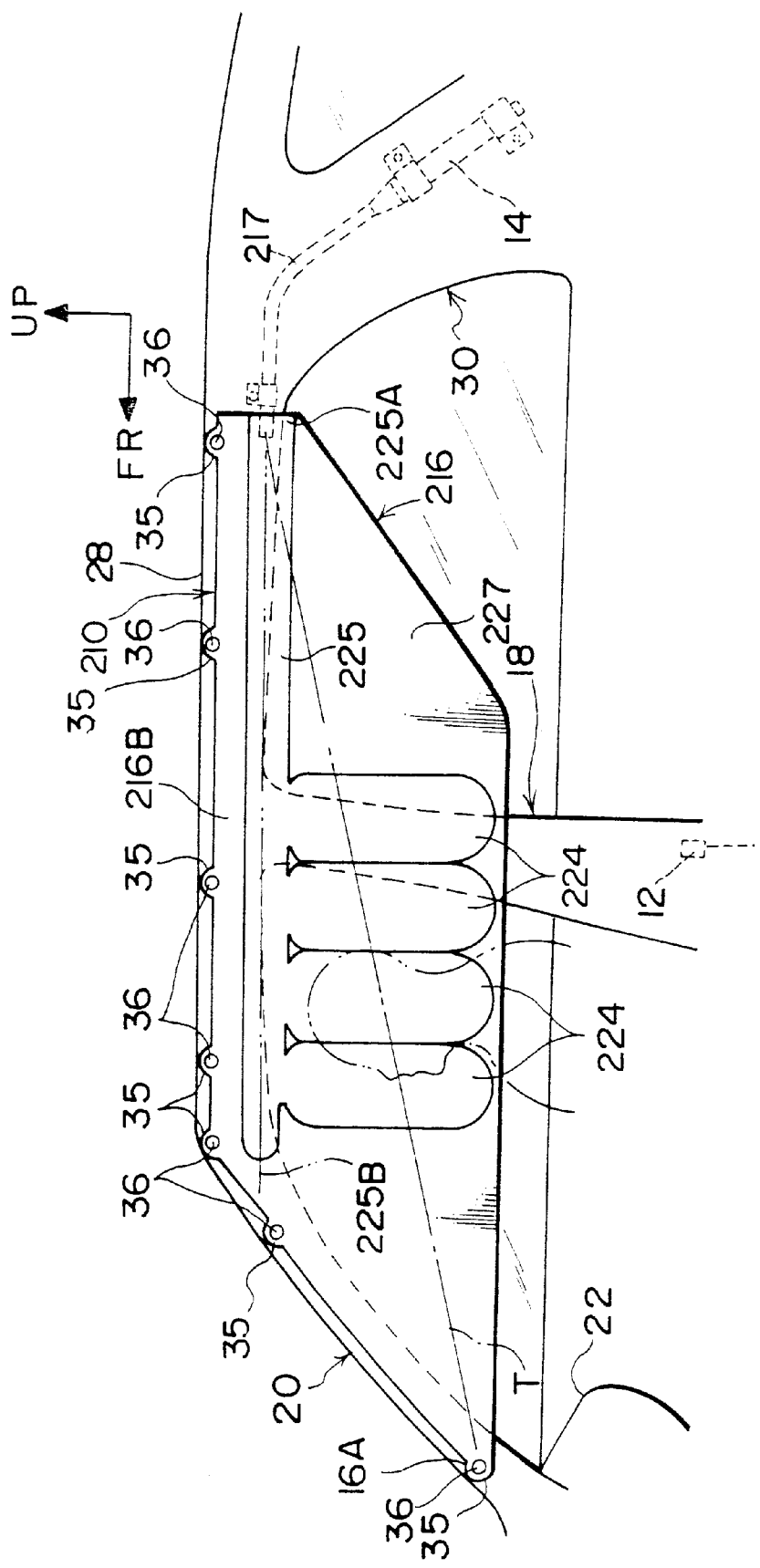
FIG. 14 is a schematic side view showing a completed state of the airbag body of the head-protecting airbag apparatus according to the fourth embodiment of the invention.

As shown in FIGS. 11 and 14, a head-protecting airbag apparatus 210 of this embodiment is similar to the first embodiment, but this embodiment is different in configuration and how to fold of an airbag body 216 from the first embodiment.

These differences will be explained below.

A plurality of generally parallel and cylindrical inflatable portion 224 extending across a tension line T connecting a front end fixed point and a rear end fixed point of the airbag body 216 and having an longitudinal direction along a vertical direction are formed at an intermediate portion, in a vertical direction, of the airbag body 216, in a side view. Upper end portions of the cylindrical inflatable portions 224 communicate with a gas introducing path 225. The gas introducing path 225 is formed generally linearly along the roof side rail 28, and a rear end portion 225A thereof is connected to the inflator 14 disposed at the C pillar 30 through a gas guide tube 217. Accordingly, gas injected from the inflator 14 flows into the cylindrical inflatable portions 224 via the gas introducing path 225.

Also, as shown in FIG. 11, the airbag body 216 is folded double into a vehicle occupant compartment outer side portion 225C and a vehicle occupant compartment inner side portion 225D at a central portion 225B (shown with a double dotted chain line in FIG. 14), in a vertical direction, of the gas introducing path 225, and the gas guide tube 217 communicates with the vehicle occupant compartment outer side portion 225C of the gas introducing path 225. Also, a portion of the airbag body 216 except for the gas introducing portion 225 is formed in a bellows-folded portion 227 on the vehicle occupant compartment inner side. The bellows-folded portion 227 is folded in a direction perpendicular to a vehicle occupant compartment inner side face of the B pillar garnish 38 disposed at an inside portion of the B pillar garnish 18. Furthermore, the airbag body 216 which has been folded is accommodated in between a vehicle transverse outer side edge portion 42A of the roof head lining 40 and the rail inner panel 34 of the roof side rail 28. The other configuration of this embodiment is similar to the first embodiment and explanation thereof is omitted.

Next, operation of this embodiment will be explained.

In this embodiment, when a predetermined or more side impact force or load acts on a side portion of the vehicle, this force is detected by the sensor 12. Therefore, the inflator 14 is actuated and a predetermined amount of gas is injected. Thereby, the airbag body 216 begins to inflate, and the airbag body 216 which has inflated is inflated out downwardly in a curtain shape from the vehicle longitudinal rear side toward the vehicle longitudinal front side while it is pressing and opening the pillar garnish of the front pillar 20 and the vehicle transverse outer edge portion 42A of the roof head lining 40.

In this embodiment, the gas introducing path 225 of the airbag body 216 is formed linearly along the roof side rail 28 and it is only folded double at the central portion 225B in the vertical direction, namely, the number of folds is few. As a result, flow resistance is reduced at the gas introducing path 225 during expansion of the airbag body. For this reason, gas flow from the inflator 14 is made smooth so that a expansion completion time is prevented from being prolonged even on a side of the airbag body 216 which is farther from the inflator 14. Thus, the expansion completion time of the airbag body 216 is shortened.

In this embodiment, also, the gas introducing path 225 and the inflatable portions 224 of the airbag body 216 whose volumes become large in a folded state of the airbag body 216 are formed at only a region corresponding to the roof side rail 28 where an accommodating space can easily be secured, as compared with the A pillar 20. As a result, since the gas introducing path 225 and the inflatable portions 224 of the airbag body 216 folded can easily be accommodated in the roof side rail portion, thereby improving easiness of assembling the airbag body in a vehicle.

In this embodiment, the portion 227 of airbag body 216 except for the gas introducing path 225 is folded in the bellows shape. Therefore, the airbag body 216 can easily be folded.

Figure 12:
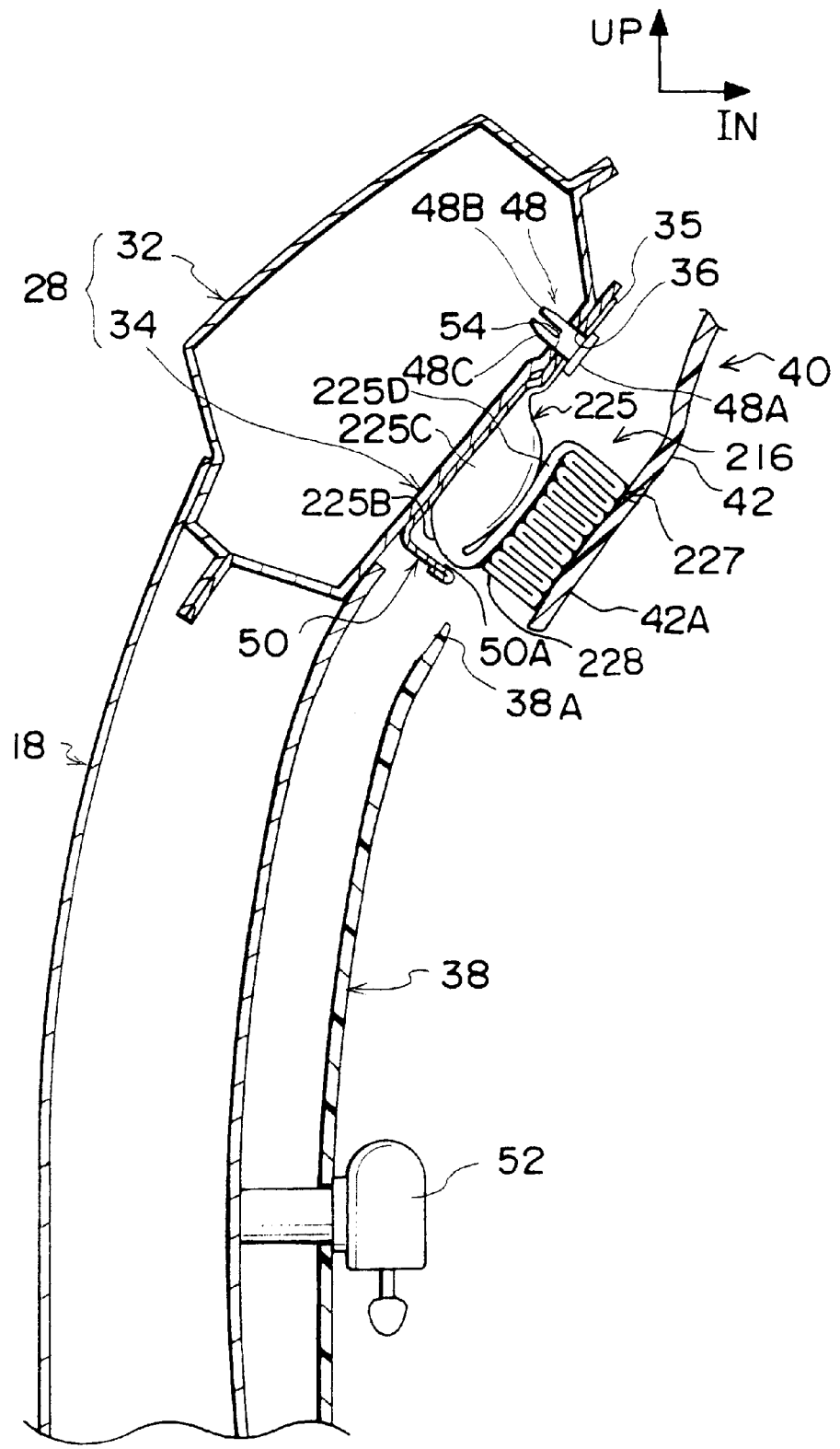
FIG. 12 is an enlarged sectional view showing an initial stage of expansion of an airbag body of the head-protecting airbag apparatus of the fourth embodiment of the invention, which corresponds to FIG. 11.
Figure 13:
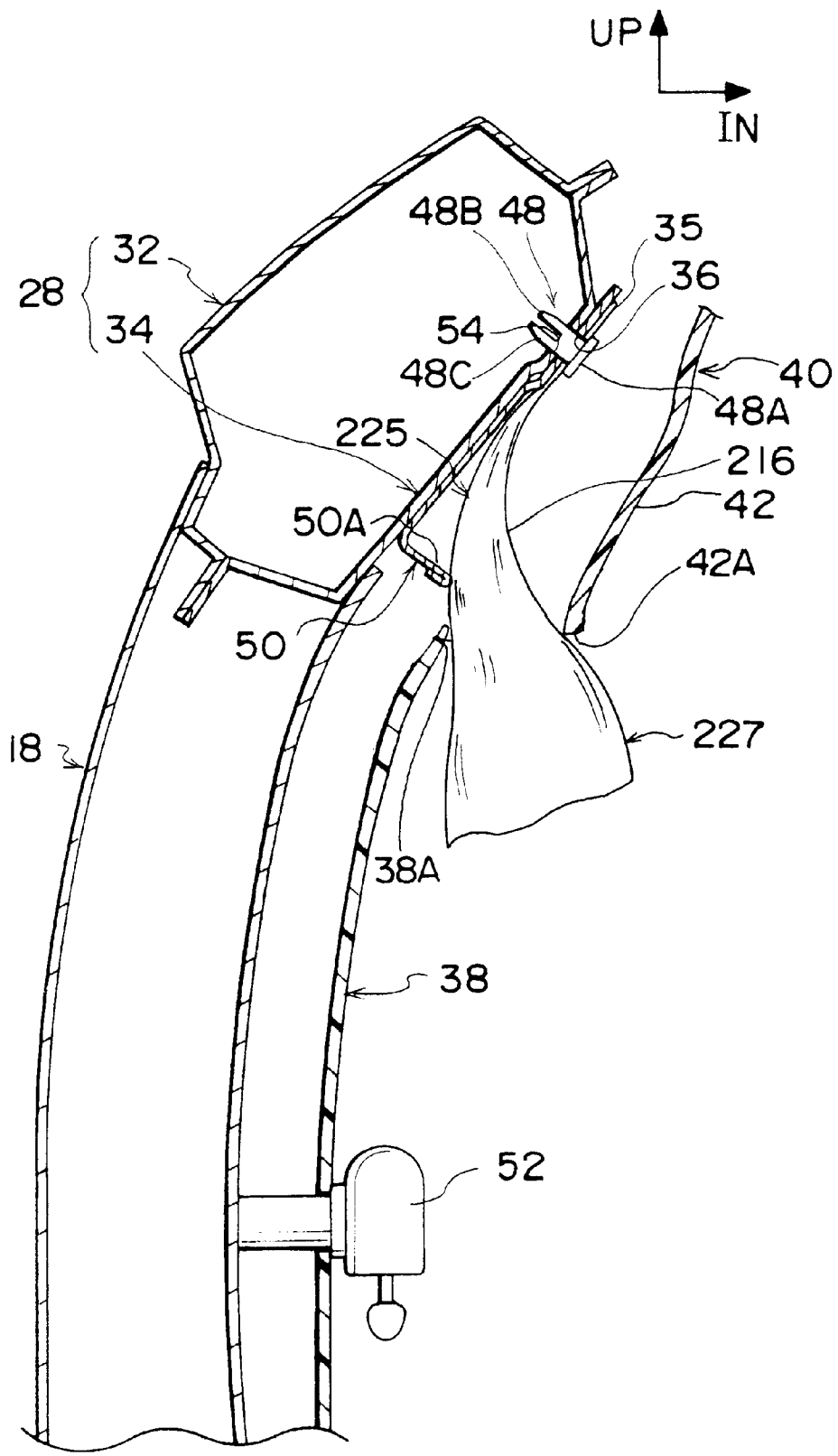
FIG. 13 is an enlarged sectional view showing a final stage of expansion of the airbag body of the head-protecting airbag apparatus of the fourth embodiment of the invention, which corresponds to FIG. 11.

In the embodiment, also, the portion 227 of the airbag body 216 except for the gas introducing path 225, namely the bellows-folded portion 227, is positioned on the vehicle transverse inner side in parallel to the gas introducing path 225. Therefore, as shown in FIG. 12, when the inflator 14 is actuated, the vehicle occupant compartment outer side portion 112C of the gas introducing path 225 communicating with the gas guide tube 217 first inflates. As a result, the vehicle occupant compartment inner side portion 225D of the gas introducing path 225 and the portion 227 of the airbag body 216 except for the gas introducing path 225 are moved in the vehicle occupant compartment inner direction to press and open the vehicle transverse outer side edge portion 42A of the roof head lining 40. Accordingly, as shown in FIG. 13, the bellows-folded portion 227 of the airbag body 216 except for the gas introducing path 225 is pressed out as is in the folded state to be expanded downwardly in a curtain shape while it is rapidly expanding in the vehicle occupant compartment inner side direction. As a result, the airbag body 216 can be prevented from being caught up by such a protrusion as a slip joint which projects from the vehicle occupant compartment inner side of the center pillar 18. In this embodiment, the lower portion of the airbag body is turned back like the first embodiment, but it may be folded in a rolled shape like the second embodiment. Also, in this embodiment, the upper portion of the airbag body includes the gas introducing path and the bellows-folded shape portion, and the lower portion thereof includes the turned-back portion.

Next, a fifth embodiment of the head-protecting airbag apparatus of the present invention will be explained with reference to FIG. 15.

In the fifth embodiment, the same reference numerals are given to the same parts or members in the fourth embodiment, and description thereof will be omitted.

Figure 15:
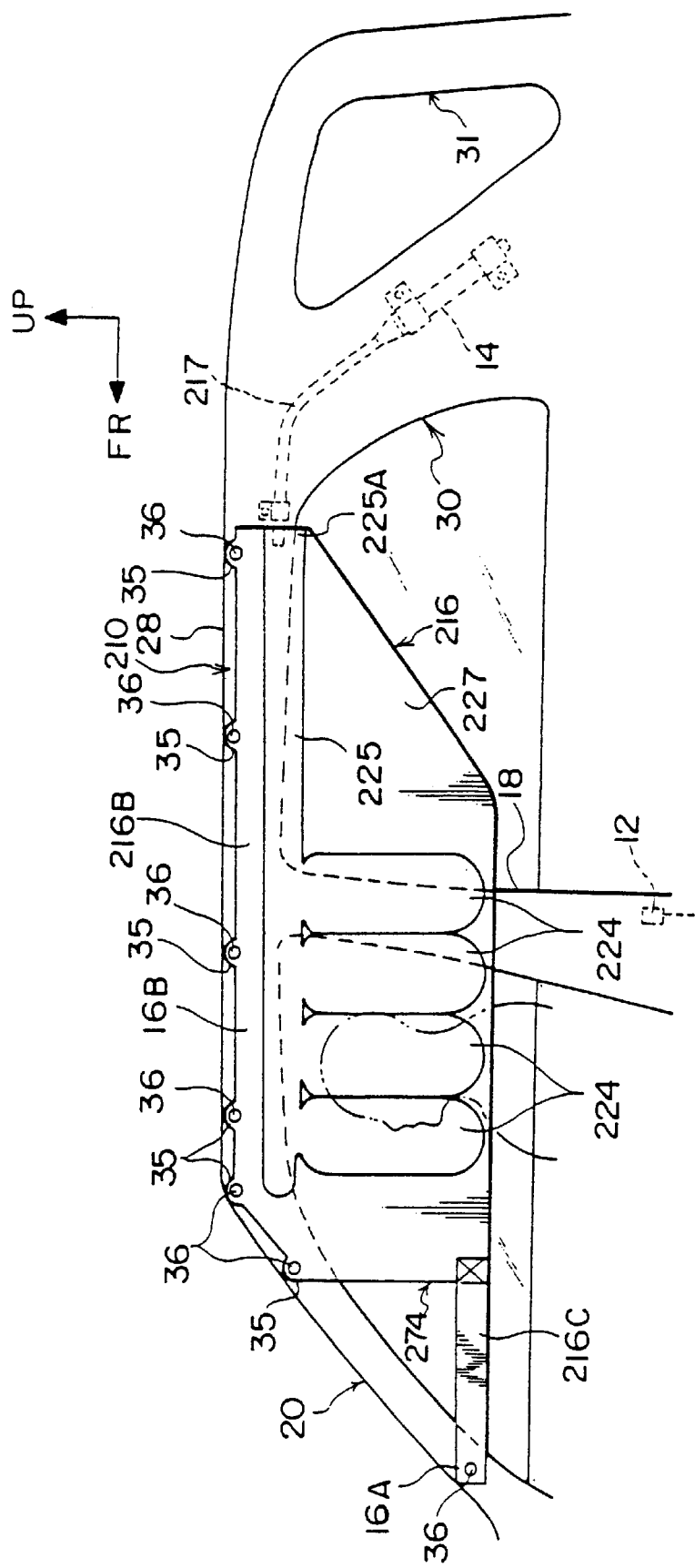
FIG. 15 is a schematic side view showing a completed state of expansion of an airbag body of a head-protecting airbag apparatus of a fifth embodiment which has been applied to a driver' seat of an occupant compartment.

As shown in FIG. 15, in this embodiment, a cut-out portion 274 is formed at a portion of the airbag body 216 expanding below the A pillar 20, a strap 216C is attached to a front end lower portion of an intermediate portion 216B of the airbag body 216 so as to extend forward.

Accordingly, in this embodiment, since the cut-out portion 274 is formed at the portion of the airbag body 216 expanding below the A pillar 20, a folded volume is reduced at the portion of the airbag body 216 expanding below the A pillar 20, as compared with the fourth embodiment. As a result, the airbag body 216 can easily be accommodated even in a small accommodating space between an A pillar 220 and an A pillar garnish (not shown).

Next, a sixth embodiment of the head-protecting airbag apparatus of the present invention will be explained with reference to FIG. 16.

In the sixth embodiment, the same reference numerals are given to the same parts or members in the fifth embodiment, and description thereof will be omitted.

Figure 16:
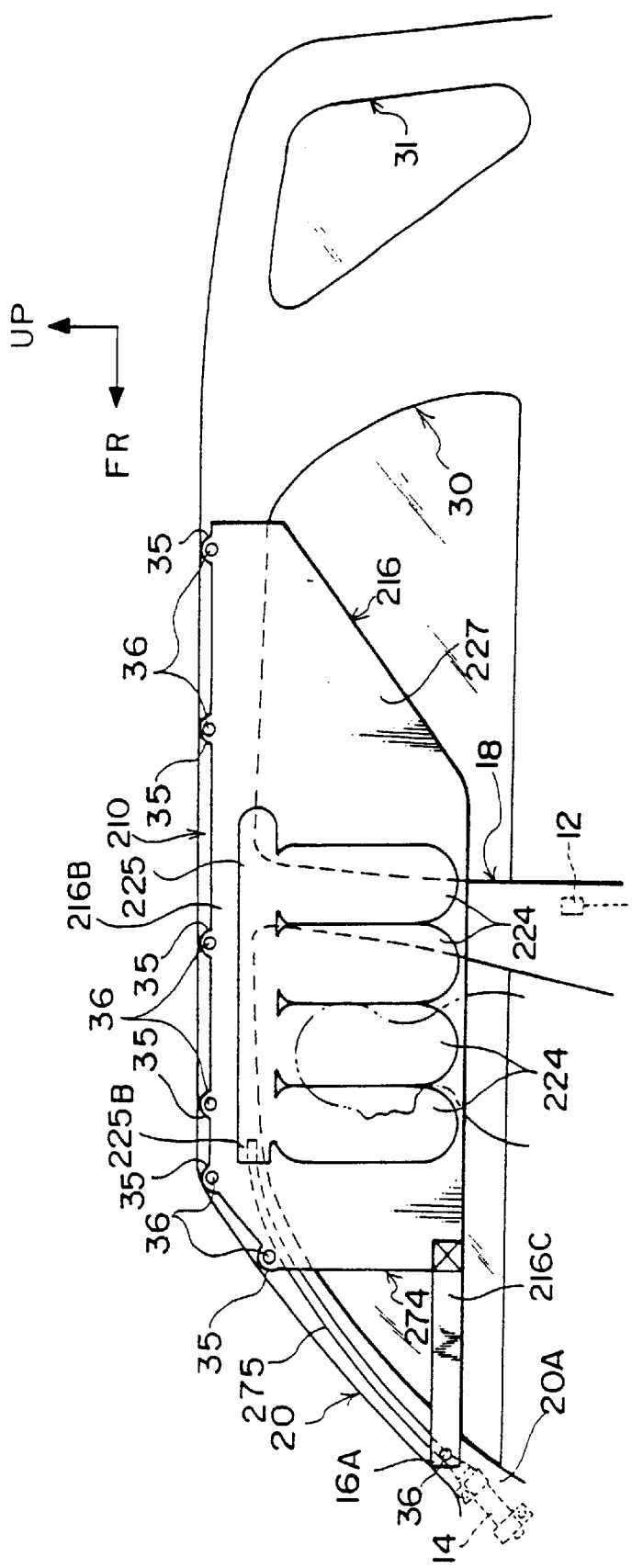
FIG. 16 is a schematic side view showing a completed state of expansion of an airbag body of a head-protecting airbag apparatus of a sixth embodiment which has been applied to a driver' seat of an occupant compartment.

As shown in FIG. 16, in this embodiment, an inflator 14 is disposed at a lower portion 20A of the A pillar 20, and an front end portion 225B of the gas introducing path 225 and the inflator 14 are connected to each other via gas introducing tube 275.

Accordingly, the inflator 14 can be disposed at the lower portion 20A of the A pillar 20, and the folded portion of the airbag body 16 accommodated in the A pillar 20 where the inflator 14 is disposed is made small in volume. As a result, easiness for mounting both the inflator 14 and the airbag body 216 to a vehicle is improved.

It should be understood that the inflator 14 can be disposed at a lower end portion of the C pillar 30 or an lower end portion of D pillar 31.

Next, a seventh embodiment of the head-protecting apparatus of the present invention will be explained with reference to FIG. 17.

In the seventh embodiment, the same reference numerals are given to the same parts or members in the fifth embodiment, and description thereof will be omitted.

Figure 17:
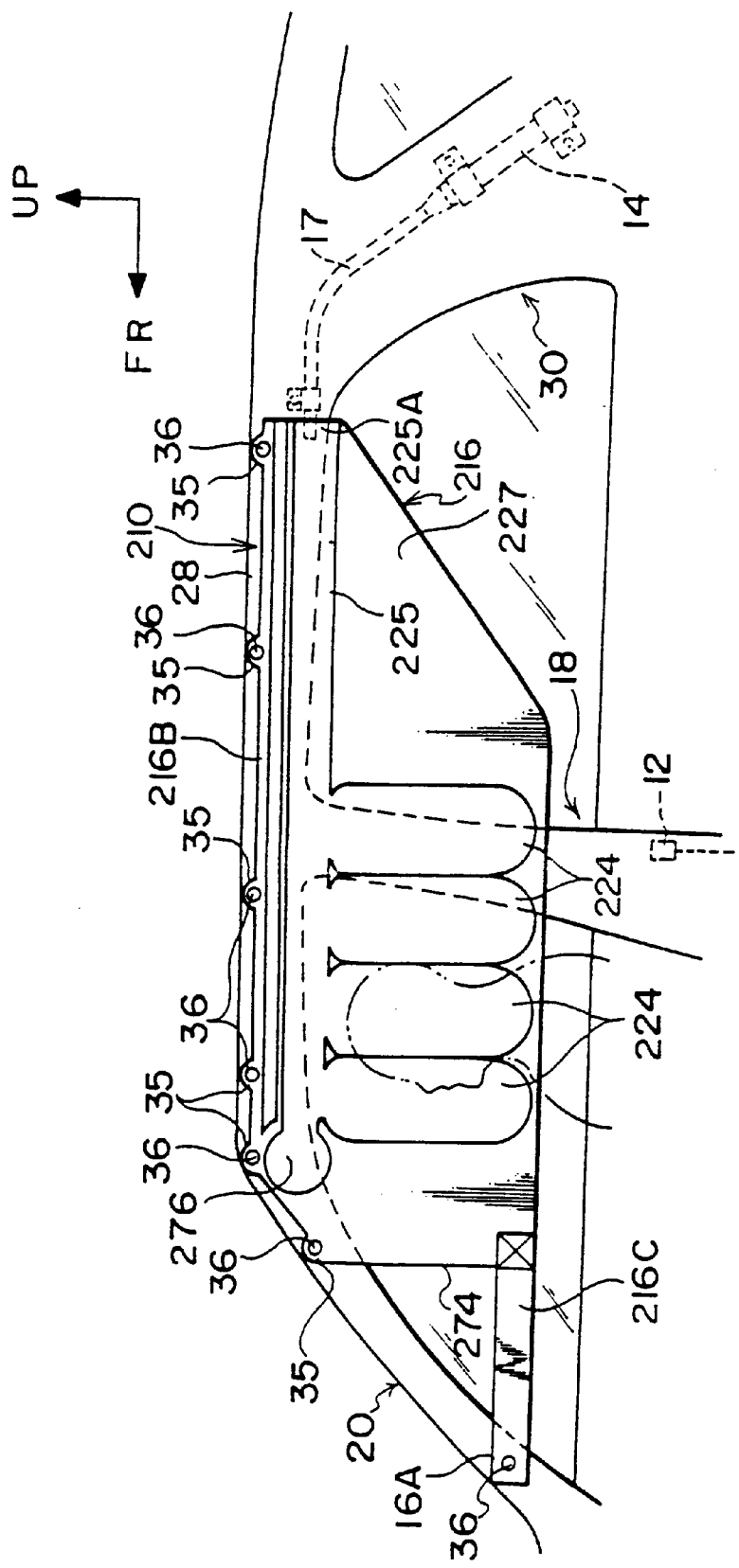
FIG. 17 is a schematic side view showing a completed state of expansion of an airbag body of a head-protecting airbag apparatus of a seventh embodiment which has been applied to a driver' seat of an occupant compartment.

As shown in FIG. 17, in this embodiment, a spherical portion 276 having a larger diameter than that of the gas introducing path 225 is formed at a front end portion which is a downstream end of the gas introducing path 225.

Therefore, when gas from the inflator 14 reaches the downstream end of the gas introducing path 225, gas pressure is reduced at the spherical portion 276 having the larger diameter as compared with the gas introducing path 225. As a result, the downstream end of the gas introducing path 225 can be prevented from being injured by the gas pressure. It should be noted that this embodiment is applicable to a structure in which the inflator 14 is connected to the front end portion of the gas introducing path 225 and the spherical portion 276 is formed at a rear end portion which is a downstream end of the gas introducing path 225.

Next, an eighth embodiment of a head-protecting airbag apparatus of the present invention will be explained with reference to FIG. 18. In this embodiment, the same reference numerals are given to the same parts or members in the fourth embodiment, and description thereof will be omitted.

Figure 18:
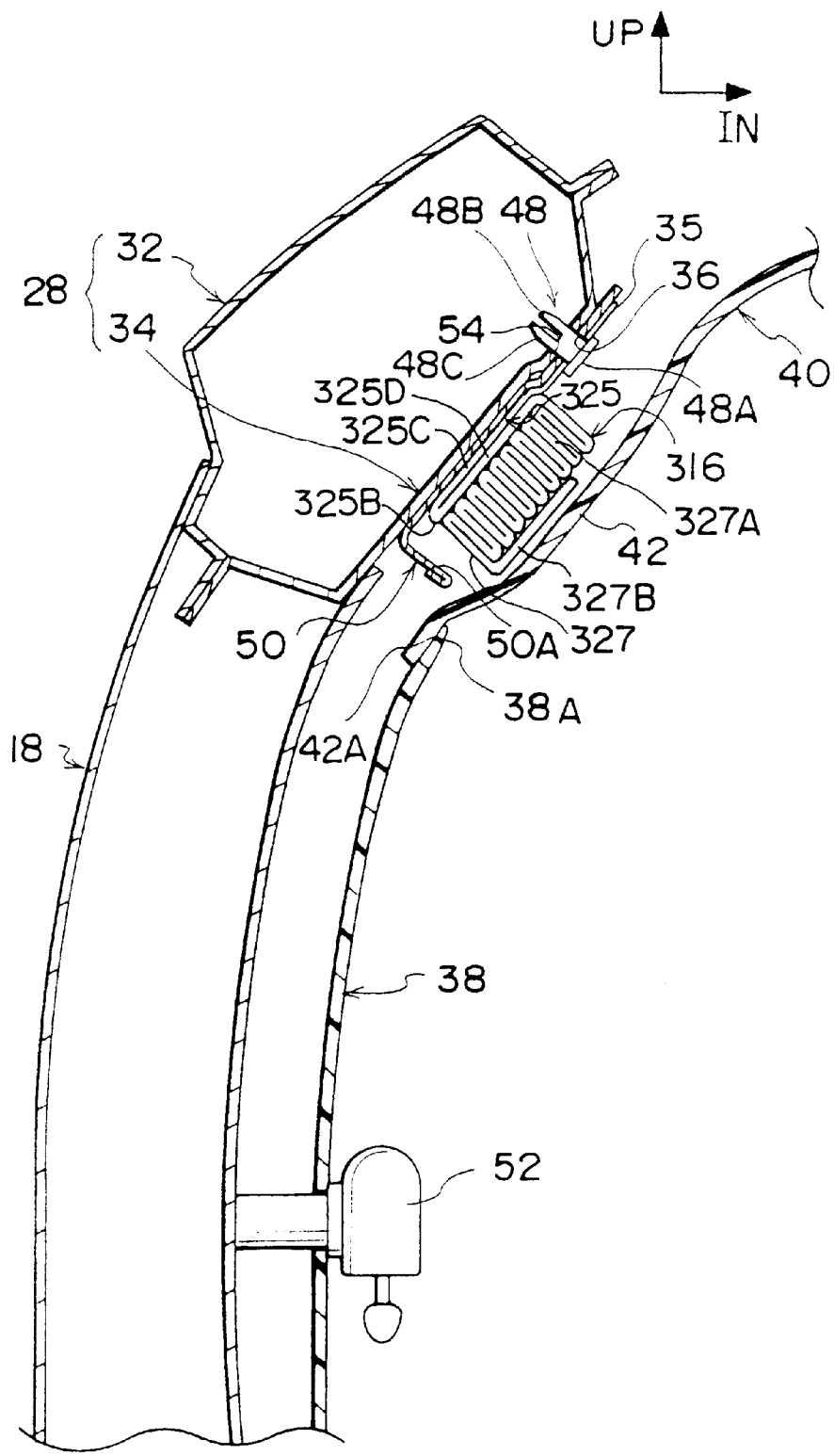
FIG. 18 is an enlarged sectional view showing a head-protecting airbag apparatus according to an eighth embodiment.

As shown in FIG. 18, an airbag body 316 in this embodiment is different in how to folding the airbag body from the fourth embodiment.

This airbag body 316 is folded double to form a vehicle transverse outer side portion 325C and a vehicle transverse inner side portion 325D at its central portion 325B, in a vertical direction, of a gas introducing path 325 like the fourth embodiment. The vehicle transverse outer side portion 325C of the gas introducing path 325 communicates with a gas guide tube (not shown). A portion of the airbag body 316 except for the gas introducing path 325 includes a bellows-folded portion 327A folded in a bellows-shape on the vehicle transverse inner side and a lower portion 327B contiguous to the bellows-folded portion 327A folded on the vehicle transverse side.

Nest, operation of this embodiment will be explained.

Figure 19:
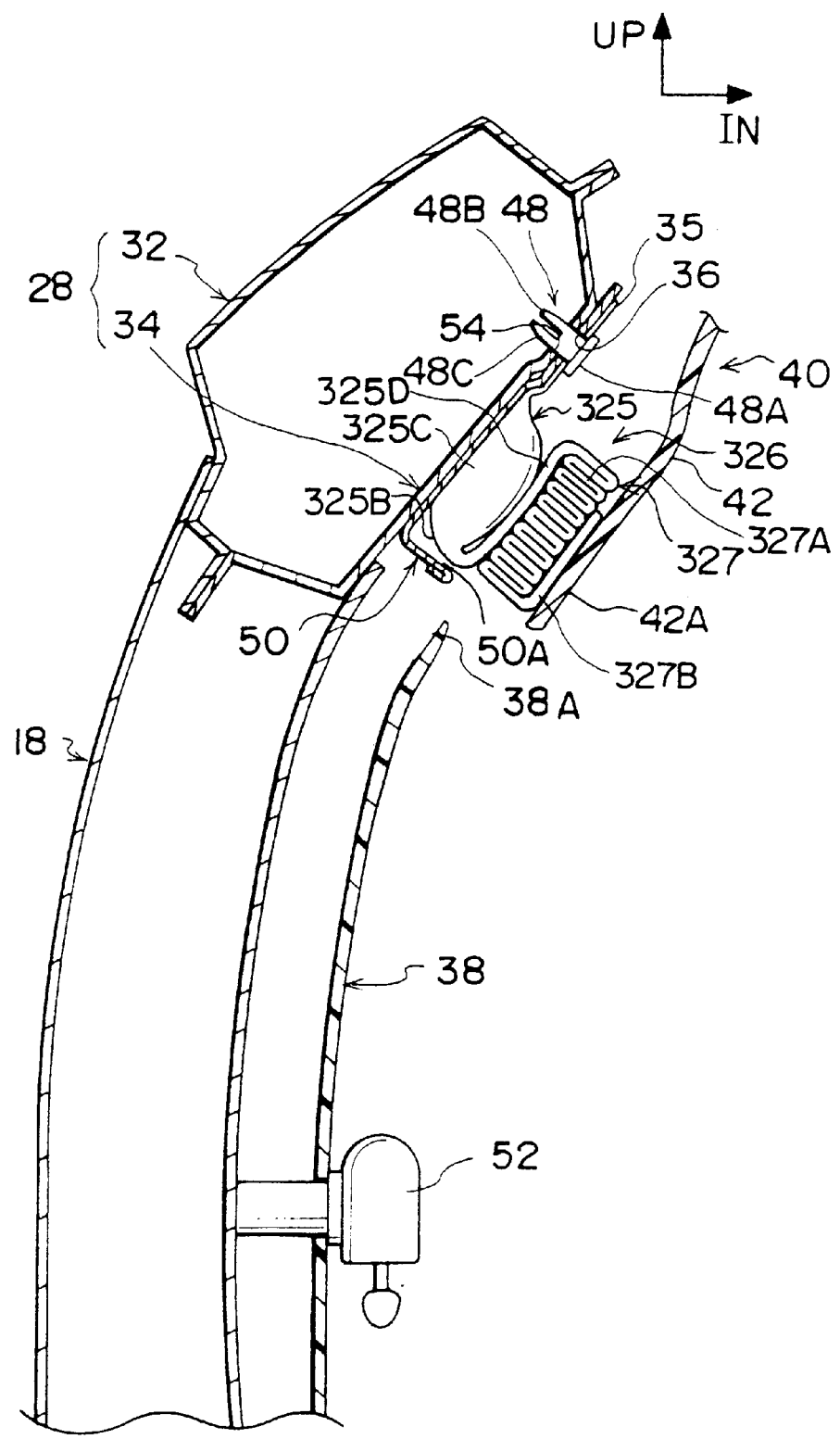
FIG. 19 is an enlarged sectional view showing an initial stage of expansion of the head-protecting airbag apparatus according to the eighth embodiment.
Figure 20:
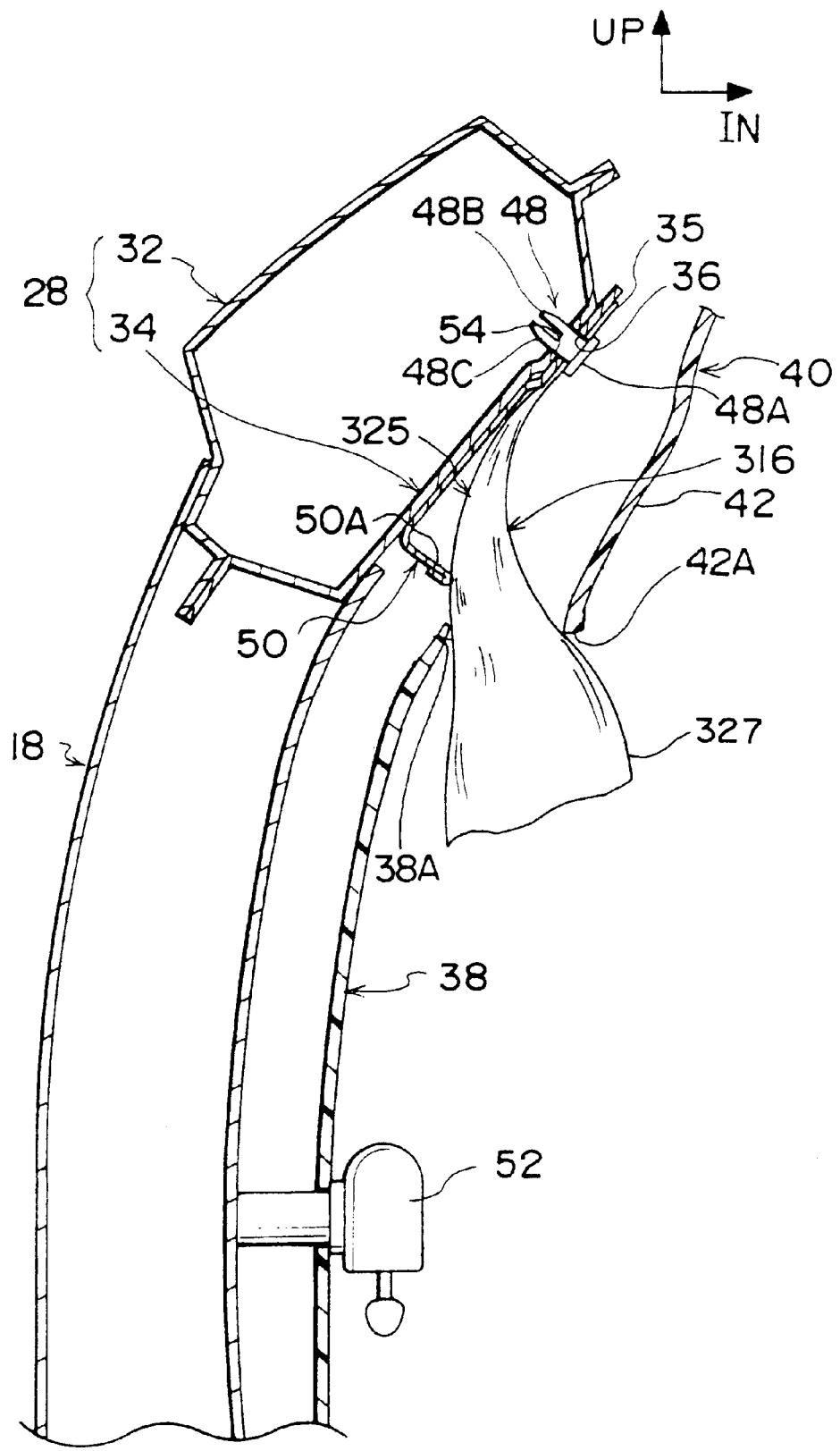
FIG. 20 is an enlarged sectional view showing a final stage of expansion of the head-protecting airbag apparatus according to the eighth embodiment.
Figure 21:
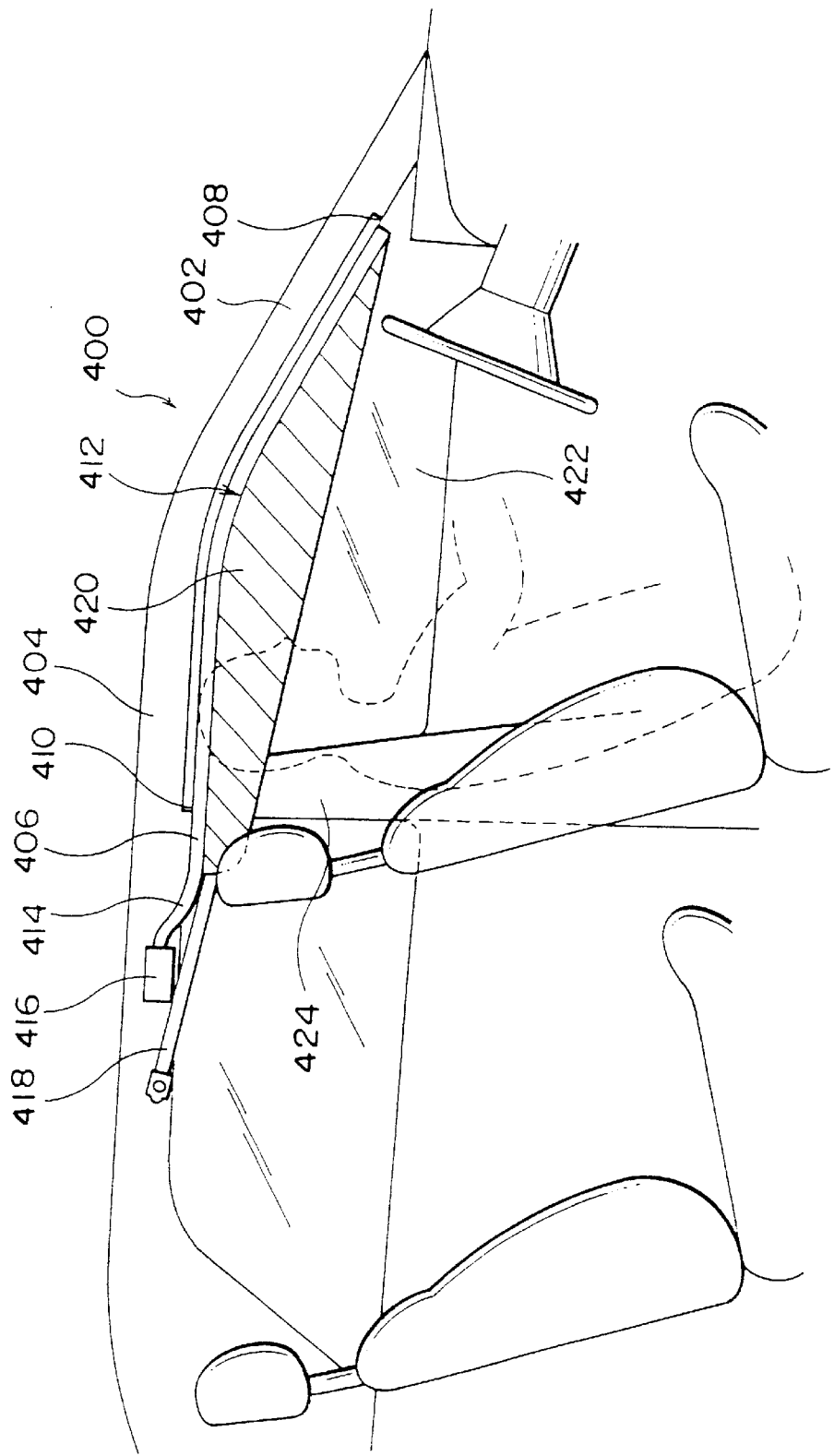
FIG. 21 is a schematic side view showing a completed state of expansion of a conventional head-protecting airbag body.

As shown in FIG. 19, when the inflator 14 is operated, gas rapidly flows into the vehicle transverse outer side portion 325C to inflate the same so that the portion 327 except for the gas introducing path 325, namely the bellows-folded portion 327A and the lower portion 327B, is pressed on the vehicle transverse inner direction to press the vehicle transverse outer side edge portion 42 in the vehicle transverse inner direction. Thereafter, as shown in FIG. 20, the airbag body 316 inflates to expand downwardly on the vehicle occupant compartment inside. Also, in this embodiment, since the lower portion 327B is expanded so as to cover a vehicle occupant compartment inside protrusion such as a slip joint from the above, the airbag body 316 can be prevented from being caught up by the vehicle occupant compartment inside protrusion more effectively as compared with the fourth embodiment. In this embodiment, the lower portion 327B is turned back like the case of the first embodiment, but the lower portion 327B may be folded in a roll. Also, in this embodiment, the upper portion of the airbag body includes the gas introducing path and the bellows-folded portion, and the lower portion includes the turned-back portion.

In the above, the present invention has been explained about specific embodiments, but it is not limited to these embodiments. It will be clear to persons skilled in the art that the embodiments can be modified or changed in various manner within the spirit and scope of the invention. For example, in the fourth to seventh embodiments, the gas introducing path 225 of the airbag body 216 is folded double at the central portion 225B, in the vertical direction, of the gas introducing path 225, but the invention may be structured such that the gas introducing path can not be folded by folding a portion of the airbag body positioned below the gas introducing path, thereby reducing gas flow resistance in the gas introducing path during expansion of the airbag body.

What is claimed is:

1. A head-protecting airbag apparatus comprising an airbag body expanding in a curtain shape is disposed in a folded state along a roof side rail across at least a center pillar, wherein the airbag body is folded such that an upper portion of the airbag body in a state in which the air bag body is attached to a vehicle body projects in a vehicle occupant compartment while pressing out a lower portion of the air bag body before the lower portion of the air bag body in the state in which the air bag body is attached to the vehicle body projects in the vehicle occupant compartment when expanding, wherein the airbag body includes the upper portion which is folded in a bellows shape and the lower portion subjected to one of turning-back performed toward an occupant compartment inner side and rolling-up performed towards the occupant compartment inner side.

2. A head-protecting airbag apparatus according to claim 1, wherein the upper portion is provided with a generally linear gas introducing path, and the gas introducing path is one of (1) not folded or (2) folded along the longitudinal direction of the gas introducing path.

3. A head-protecting airbag apparatus according to claim 1, wherein the lower portion is subjected to the rolling-up and a lower part of the lower portion is turned back by a turning-back line, which is formed in a substantially intermediate portion of the lower portion in a vertical direction of the lower portion, such that the lower part of the lower portion is positioned on the vehicle occupant compartment inner side, and the lower portion in which the lower part of the lower portion is turned back is rolled up from the turning-back line such that a rolling-up of the lower portion in which the lower part of the lower portion is turned back is subject toward the vehicle occupant compartment inner side.

4. A head-protecting airbag apparatus according to claim 3, wherein the turning-back line of the lower portion is set at a position above a predetermined vehicle occupant compartment inside protrusion disposed at an inside of the vehicle occupant compartment of the center pillar.

5. A head-protecting airbag apparatus according to claim 1, further comprising a guide portion for guiding the airbag body inside a vehicle occupant compartment when the airbag inflates.

6. A head-protecting airbag apparatus according to claim 1, further comprising an inflator for generating gas; a gas guide tube for connecting the inflator and the airbag body and for guiding the gas from the inflator to the airbag body; and straps, one ends of which are respectively connected to a lower and front end and a lower and rear end of the airbag body, the other ends thereof being fixed to portions of a vehicle body.

7. A head-protecting airbag apparatus according to claim 1, further comprising a guide portion for guiding the airbag body when the airbag inflates.

8. A head-protecting airbag apparatus according to claim 7, wherein said guide portion is formed at a lower end portion of a plate member which has a substantially L-shaped cross sectional configuration, said plate member being provided such that said guide portion projects toward an interior of the occupant compartment and said guide portion is positioned below the lower end portion of the air bag body.

9. A head-protecting airbag apparatus according to claim 1, wherein, when expanding, while the air bag body is pressed out from a position, in which folded air bag body is attached to the vehicle body, toward the vehicle occupant compartment, the upper portion expands before the lower portion expands.

10. A head-protecting airbag apparatus comprising an airbag body expanding in a curtain shape is disposed in a folded state along a roof side rail across at least a center pillar, wherein the airbag body comprises a gas introducing path formed only on a region positioned below the roof side rail generally linearly along the roof side rail, one end of the gas introducing path communicating with an inflator, and a plurality of inflating chambers formed in only a region positioned below the roof side rail, one end of the inflating chambers communicating with the gas introducing path, and the gas introducing path is one of (1) not folded or (2) folded along the longitudinal direction of the gas introducing path, wherein a portion of the airbag body except for the gas introducing path has a bellows-folded portion and a turned-back portion toward a vehicle compartment inner side formed sequentially and downwardly along a vertical direction.

11. A head-protecting airbag apparatus comprising an airbag body expanding in a curtain shape is disposed in a folded state along a roof side rail across at least a center pillar, wherein the airbag body is folded such that an upper portion of the airbag body in a state in which the air bag body is attached to a vehicle body projects in a vehicle occupant compartment while pressing out a lower portion of the air bag body before the lower portion of the air bag body in the state in which the air bag body is attached to the vehicle body projects in the vehicle occupant compartment when expanding, wherein the upper portion of the air bag body is folded in a bellows shape and the lower portion of the airbag body is subjected to turning-back performed toward an occupant compartment inner side.

12. A head-protecting airbag apparatus according to claim 11, wherein the lower portion subjected to turning-back has a distal end that is positioned on an upper face of the upper portion.

13. A head-protecting airbag apparatus according to claim 11, wherein the lower portion subjected to turning-back has a distal end that is positioned on a vehicle occupant compartment inner side.

14. A head-protecting airbag apparatus according to claim 11, wherein the turning-back is positioned so as to cover the upper portion from the vehicle occupant compartment inner side.

* * * * *